(12) United States Patent
Watanabe

(10) Patent No.: US 8,040,385 B2
(45) Date of Patent: Oct. 18, 2011

(54) IMAGE PICKUP APPARATUS

(75) Inventor: Nobuyuki Watanabe, Yokohama (JP)

(73) Assignee: Olympus Corporation, Tokyo (JP)

( * ) Notice: Subject to any disclaimer, the term of this patent is extended or adjusted under 35 U.S.C. 154(b) by 1873 days.

(21) Appl. No.: 11/059,490

(22) Filed: Feb. 15, 2005

(65) Prior Publication Data
US 2005/0141047 A1    Jun. 30, 2005

Related U.S. Application Data

(63) Continuation of application No. PCT/JP03/15423, filed on Dec. 2, 2003.

(30) Foreign Application Priority Data

Dec. 2, 2002    (JP) .................................. 2002-349968

(51) Int. Cl.
H04N 5/228    (2006.01)

(52) U.S. Cl. ..................... 348/222.1; 348/241; 348/243; 348/246; 348/247

(58) Field of Classification Search ............... 348/222.1, 348/241, 243, 246, 247; 382/275
See application file for complete search history.

(56) References Cited

U.S. PATENT DOCUMENTS

| | | | |
|---|---|---|---|
| 4,831,451 A | 5/1989 | Hynecek | |
| 6,130,420 A | 10/2000 | Tanaka et al. | |
| 6,204,879 B1 | 3/2001 | Koseki et al. | |
| 6,295,087 B1 | 9/2001 | Nohda | |
| 6,535,688 B1 | 3/2003 | Kawamura et al. | |
| 6,992,706 B2 | 1/2006 | Mabuchi et al. | |
| 7,012,639 B1 * | 3/2006 | Ishikawa et al. ............ | 348/222.1 |
| 7,034,869 B2 | 4/2006 | Sugimori | |
| 7,088,392 B2 | 8/2006 | Kakarala et al. | |
| 7,170,529 B2 | 1/2007 | Chang | |
| 7,242,432 B2 | 7/2007 | Watanabe | |
| 7,256,827 B1 * | 8/2007 | Sato .............................. | 348/272 |
| 7,292,273 B2 | 11/2007 | Shioji | |
| 7,339,616 B2 | 3/2008 | Mabuchi | |

(Continued)

FOREIGN PATENT DOCUMENTS

EP    1 164 781 A1    12/2001

(Continued)

OTHER PUBLICATIONS

English-language supplemental European Search Report dated Jul. 15, 2009, issued in counterpart European Application No. EP 03 77 6025.

(Continued)

*Primary Examiner* — Yogesh Aggarwal

(74) *Attorney, Agent, or Firm* — Holtz, Holtz, Goodman & Chick, P.C.

(57) ABSTRACT

An image pickup apparatus includes a photoelectric conversion element which photoelectrically converts an optical image formed by an imaging optical system to acquire image data, a read control unit which thins out pixels, as needed, and reads the image data acquired by the photoelectric conversion element, a region setting unit which sets the region of an output image, a read rule selection unit which selects the pixel thinning read rule of the read control unit, and a distortion correction unit which corrects distortion of the image data read from the photoelectric conversion element. The distortion correction unit includes a filter processing unit which executes filter processing for the image data, and a filter coefficient setting unit which sets the filter coefficient of the filter processing unit in accordance with the pixel thinning read rule.

28 Claims, 13 Drawing Sheets

U.S. PATENT DOCUMENTS

| | | |
|---|---|---|
| 7,561,195 B2 | 7/2009 | Watanabe |
| 2001/0033333 A1 | 10/2001 | Suzuki et al. |
| 2002/0135683 A1 | 9/2002 | Tamama et al. |
| 2002/0154912 A1 | 10/2002 | Koseki et al. |
| 2002/0158973 A1 | 10/2002 | Gomi |
| 2003/0020819 A1 | 1/2003 | Fukuda |
| 2003/0052981 A1 | 3/2003 | Kakarala et al. |
| 2003/0193593 A1 | 10/2003 | Lee et al. |
| 2003/0227552 A1 | 12/2003 | Watanabe |
| 2005/0141047 A1* | 6/2005 | Watanabe ............... 358/471 |
| 2006/0237630 A1 | 10/2006 | Watanabe |

FOREIGN PATENT DOCUMENTS

| | | |
|---|---|---|
| EP | 1 289 310 A2 | 3/2003 |
| JP | 62-219754 A | 9/1987 |
| JP | 9-233394 A | 9/1997 |
| JP | 2000-41186 A | 2/2000 |
| JP | 2000-308076 A | 11/2000 |
| JP | 2001-16441 A | 1/2001 |
| JP | 2001-016441 A | 1/2001 |
| JP | 2001-157106 A | 6/2001 |
| JP | 2001-245141 A | 9/2001 |
| JP | 2001-309236 A | 11/2001 |
| JP | 2002-112096 A | 4/2002 |
| JP | 2002-135793 A | 5/2002 |
| JP | 2002-238058 A | 8/2002 |
| JP | 2002-314868 A | 10/2002 |
| JP | 2002-330329 A | 11/2002 |
| JP | 2002-354292 A | 12/2002 |
| JP | 2002-354344 A | 12/2002 |
| JP | 2002-369083 A | 12/2002 |
| JP | 2003-46876 A | 2/2003 |
| JP | 2003-338988 A | 11/2003 |

OTHER PUBLICATIONS

Muresan, D et al. "Adaptive optimal-recovery image interpolation." 2001 IEEE International Conference on Acoustics, Speech, and Signal Processing Proceedings. Salt Lake City, UT. May 7-11, 2001. vol. 3, pp. 1949-1952.

* cited by examiner

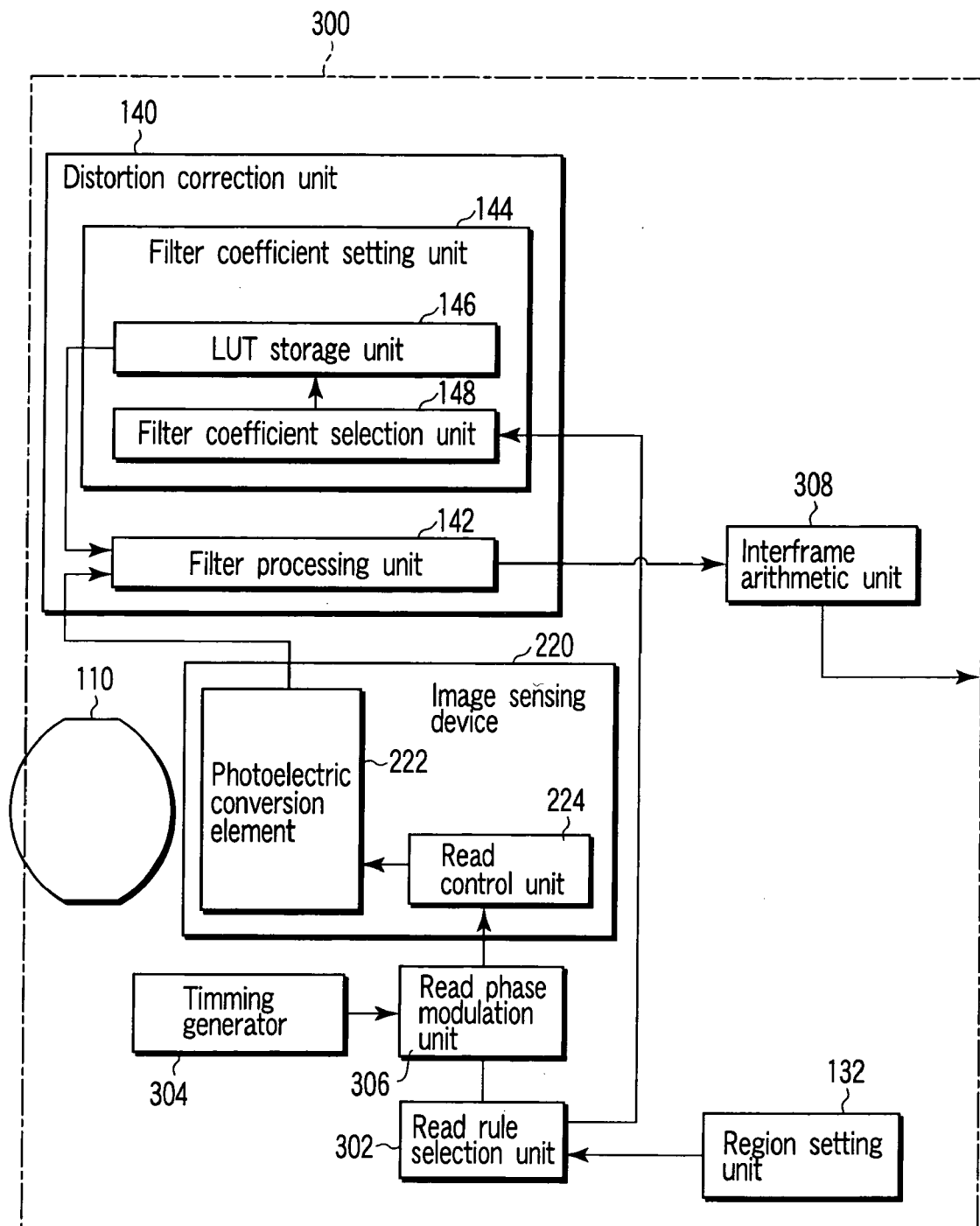
F I G. 17

IMAGE PICKUP APPARATUS

CROSS-REFERENCE TO RELATED APPLICATIONS

This is a Continuation Application of PCT Application No. PCT/JP03/15423, filed Dec. 2, 2003, which was published under PCT Article 21(2) in Japanese.

This application is based upon and claims the benefit of priority from prior Japanese Patent Application No. 2002-349968, filed Dec. 2, 2002, the entire contents of which are incorporated herein by reference.

BACKGROUND OF THE INVENTION

1. Field of the Invention

The present invention relates to a digital image pickup apparatus and, more particularly, to a digital image pickup apparatus which quickly generates a high-quality image with a smaller number of pixels than that of an image sensing device mounted in the image pickup apparatus.

2. Description of the Related Art

Along with the recent rapid spread of personal-computers, the demand for digital cameras serving as image input devices is increasing. In addition, high-quality recording apparatuses such as digital video recorders are widely used as video recorders.

The image quality of an electronic still camera is decided by several factors. Especially, the number of pixels of an image sensing element is a very important factor for the resolution of a sensed image. Some recent commercially available electronic still cameras have more than 5 million pixels. However, data of 5 million pixels is not always necessary for all application purposes. Images displayed on the Webs of the Internet often have, if anything, smaller pixel sizes.

In current digital cameras, the flashing time from the image sensing element to the image memory is a bottleneck. Most models having a large number of pixels cannot execute high-speed continuous shooting. In addition, even digital cameras need to have a video sensing function as an additional function. Hence, transfer to the memory must be done at a high speed. For this purpose, the data amount to be processed is preferably reduced in advance.

When the number of pixels of an output image is smaller than that of the image sensing element, the number of pixels to be used is limited in advance. Accordingly, the amount of data to be transferred from the image sensing element to the memory can be reduced, and the memory transfer rate can be increased.

In size reduction by linear interpolation, an image having a large size is generated by using all pixels. Then, an image with a small size is generated by linear interpolation.

FIG. 15 shows a state in which a full-color reduced image is generated from a Bayer matrix by bilinear interpolation sampling. In bilinear interpolation shown in FIG. 15, full-color data of points A, B, C, and D are calculated from R, G, and B data of 12 neighboring points. More specifically, the full-color data of the point A is obtained by linear combination of R43, R45, R63, R65, B34, B36, B54, B56, G44, G53, G55, and G64. Similarly, the full-color data of the point B is obtained by linear combination of R03, R05, R23, R25, B14, B16, B34, B36, G15, G24, G26, and G35. This also applies to the points C and D.

FIG. 16 shows a state in which a full-color reduced image is generated from a Bayer matrix by bicubic interpolation sampling. In bicubic interpolation shown in FIG. 16, full-color data of a point is calculated from R, G, and B data of 48 neighboring points. For example, the full-color data of the point B is obtained by linear combination of R61, R63, R65, R67, R01, R03, R05, R07, R21, R23, R25, R27, R41, R43, R45, R47, B72, B74, B76, B70, B12, B14, B16, B10, B32, B34, B36, B30, B52, B54, B56, B50, G75, G04, G06, G13, G15, G17, G22, G24, G26, G20, G33, G35, G37, G44, G46, and G55.

Such resizing by linear interpolation can ensure a high image quality. However, since linear interpolation is executed by using all pixel data, the arithmetic amount is large. Hence, this method is inappropriate for the above-described continuous shooting function or video sensing.

There is a method of reducing the data amount of memory read, in which an integration function is added to the image sensing element so that a reduced image is generated by reading out a small number of averaged data. Jpn. Pat. Appln. KOKAI Publication No. 2001-245141 discloses a high-speed image reducing method using this method.

Jpn. Pat. Appln. KOKAI Publication No. 2001-016441 discloses an apparatus which executes data thinning and also corrects distortion of data when the number of resolutions is limited. An embodiment of this reference discloses creation of 400-dpi data by an apparatus having a resolution of 600 dpi. When 600-dpi data is directly thinned out, the data is distorted. To cope with this, pixel data to compensate for the distortion of positions is generated from the 600-dpi data by linear interpolation.

The method disclosed in Jpn. Pat. Appln. KOKAI Publication No. 2001-245141 is effective for reduction at a reduction ratio of about 20% or less. In reduction at a high reduction ratio (of about 40% or more), however, the distortion of an image by the readout pixel positions cannot be removed only by averaging by integration. It is therefore difficult to form a high-quality image while changing the size at a reduction magnification in a wide range.

The apparatus disclosed in Jpn. Pat. Appln. KOKAI Publication No. 2001-16441 creates 400-dpi data by executing interpolation totally using 600-dpi data obtained by scanning. The present invention discloses a new technique related to interlaced scanning which copes with a case wherein data of a basic resolution (in Jpn. Pat. Appln. KOKAI Publication No. 2001-16441, 600-dpi data obtained by scanning) cannot totally be read because of a limitation on the read time. For example, a data array free from distortion is created from a thinned data array as shown in FIG. 6(b) in Jpn. Pat. Appln. KOKAI Publication No. 2001-16441.

BRIEF SUMMARY OF THE INVENTION

An image pickup apparatus according to the present invention includes an image sensing device. The image sensing device includes a photoelectric conversion element which photoelectrically converts an optical image to acquire image data, and a read control unit which thins out pixels, as needed, and reads the image data acquired by the photoelectric conversion element. The image pickup apparatus further includes a region setting unit which sets the region of the output image from the image sensing device, a read rule selection unit which selects the pixel thinning read rule of the read control unit in accordance with the region set by the region setting unit, and a distortion correction unit which corrects distortion of the image data read from the photoelectric conversion element by the read control unit. The distortion correction unit includes a filter processing unit which executes filter processing for the image data read from the photoelectric conversion element on the basis of the pixel thinning read rule selected by the read rule selection unit.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 17 is a block diagram showing the arrangement of an image pickup apparatus according to the third embodiment of the present invention.

DETAILED DESCRIPTION OF THE INVENTION

The embodiments of the present invention will be described below with reference to the accompanying drawings.

First Embodiment

Figure 1:
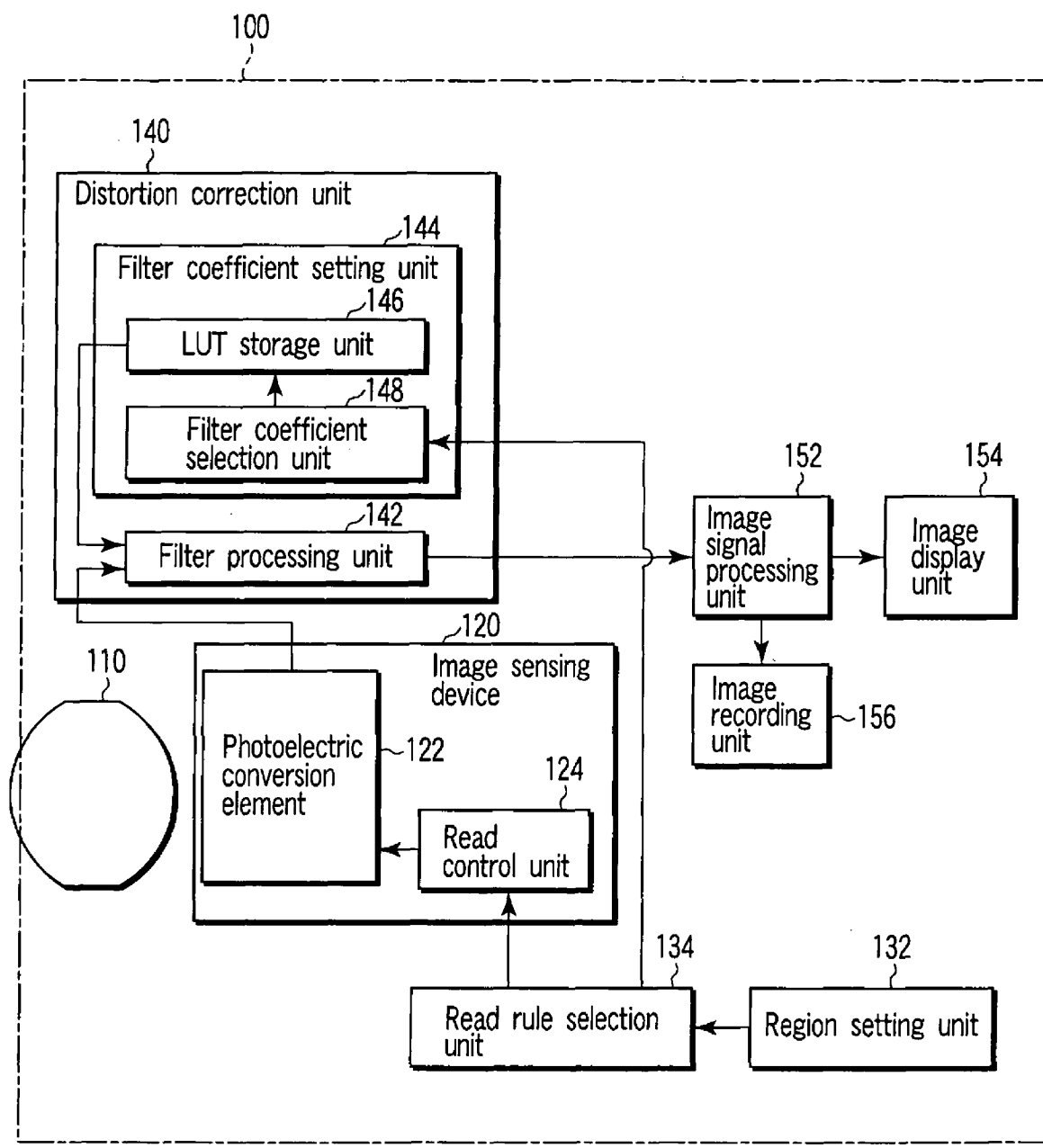
FIG. 1 is a block diagram showing the arrangement of an image pickup apparatus according to the first embodiment of the present invention.

FIG. 1 shows the arrangement of an image pickup apparatus according to the first embodiment of the present invention. An image pickup apparatus 100 has an imaging optical system 110 and an image sensing device 120. The imaging optical system 110 forms an optical image of an object. The image sensing device 120 outputs an image signal in a predetermined region of the optical image formed by the imaging optical system 110. The image sensing device 120 has a two-dimensional photoelectric conversion element (image sensing element) 122 and a read control unit 124. The photoelectric conversion element 122 photoelectrically converts the optical image formed by the imaging optical system 110 and acquires digital image data (pixel data set). The read control unit 124 executes, as needed, pixel thinning of the image data acquired by the photoelectric conversion element 122, and reads the image data.

The image pickup apparatus 100 also has a region setting unit 132, a read rule selection unit 134, and a distortion correction unit 140. The region setting unit 132 sets the region (i.e., the above-described predetermined region) of the image to be output (displayed) (i.e., specifies the size and position of the image to be displayed). The read rule selection unit 134 selects the pixel thinning read rule of the read control unit 124 in accordance with the region set by the region setting unit 132. The distortion correction unit 140 corrects distortion of the digital image data read from the photoelectric conversion element 122 by the read control unit 124.

On the basis of the pixel thinning read rule selected by the read rule selection unit 134, the read control unit 124 reads pixel data in a corresponding range of the pixel matrix in the photoelectric conversion element 122. As a result, thinned image data is output from the image sensing device 120.

The distortion correction unit 140 has a filter processing unit 142 and a filter coefficient setting unit 144. The filter processing unit 142 executes filter processing for the digital image data read from the photoelectric conversion element 122 by the read control unit 124. The filter coefficient setting unit 144 sets a filter coefficient to be used for filter processing by the filter processing unit 142 in accordance with the pixel thinning read rule selected by the read rule selection unit 134.

The filter coefficient setting unit 144 has an LUT storage unit 146 and a filter coefficient selection unit 148. The LUT storage unit 146 stores a lookup table (LUT) containing a plurality of filter coefficients. The filter coefficient selection unit 148 selects a filter coefficient from the lookup table stored in the LUT storage unit 146.

The filter coefficient setting unit 144 need not always have the LUT storage unit 146 and filter coefficient selection unit 148. The filter coefficient setting unit 144 may calculate a filter coefficient by executing arithmetic processing corresponding to the pixel thinning read rule selected by the read rule selection unit 134.

The filter coefficient setting unit 144 that uses an LUT requires a large memory capacity to store the LUT, though the load of arithmetic processing can be small. On the other hand, the filter coefficient setting unit 144 that uses no LUT requires no large memory capacity, though the load of arithmetic processing is large.

The image pickup apparatus 100 also has an image signal processing unit 152 and an image display unit 154. The image signal processing unit 152 executes predetermined processing (e.g., white balance, gray level conversion, or edge enhancement) for the distortion-corrected image signal output from the distortion correction unit 140. The image display unit 154 displays an image in accordance with the image signal output from the image signal processing unit 152. In addition, the image pickup apparatus 100 has an image recording unit 156 which records an image in accordance with the image signal output from the image signal processing unit 152.

When no region is set by the region setting unit 132, the image pickup apparatus 100 directly displays image data acquired by the photoelectric conversion element 122 on the image display unit 154. That is, all the pixel data of the image data are displayed. Hence, the image display unit 154 displays the same image as the optical image formed by the imaging optical system 110.

The region setting unit 132 includes, e.g., a graphical user interface (GUI) for the screen of the image display unit 154. Hence, the user can designate a desired range to be displayed by operating a button or mouse on the image displayed on the screen of the image display unit 154.

The image sensing device 120 can execute a thinning read operation. By the thinning read operation, the image sensing device 120 can read pixels in a specific region on the photoelectric conversion element 122 in a shorter time than the read of all pixels.

For example, when the photoelectric conversion element 122 is an image sensing element using CMOS, the image sensing device 120 can designate a read position by using shift registers in both the horizontal and vertical directions.

More specifically, the ith element of the jth line is defined as C(i, j). Pixels from there in the horizontal direction are defined as C(i+1, j), C(i+2, j), C(i+3, j), C(i+4, j), C(i+5, j), C(i+6, j), C(i+7, j), C(i+8, j) . . . . In this case, the data can be thinned out at arbitrary horizontal positions and read, like C(i+1, j), C(i+2, j), C(i+3, j), C(i+4, j), C(i+7, j), C(i+8, j), . . . .

This also applies to the vertical direction. Pixels arrayed in the direction of lines, i.e., jth line, (j+1)th line, (j+2)th line . . . can be thinned out at arbitrary lines.

When the photoelectric conversion element 122 is a CCD, it reads data while shifting charges in the horizontal direction. For this reason, the image sensing device 120 reads all pixels in the horizontal direction but can thin out the data in the vertical direction.

The distortion correction unit 140 interpolates the thinned digital image data with omitted information and also executes filter processing for size conversion. That is, in this specification, distortion correction means simultaneously executing "interpolation" and "size conversion".

Figure 2:
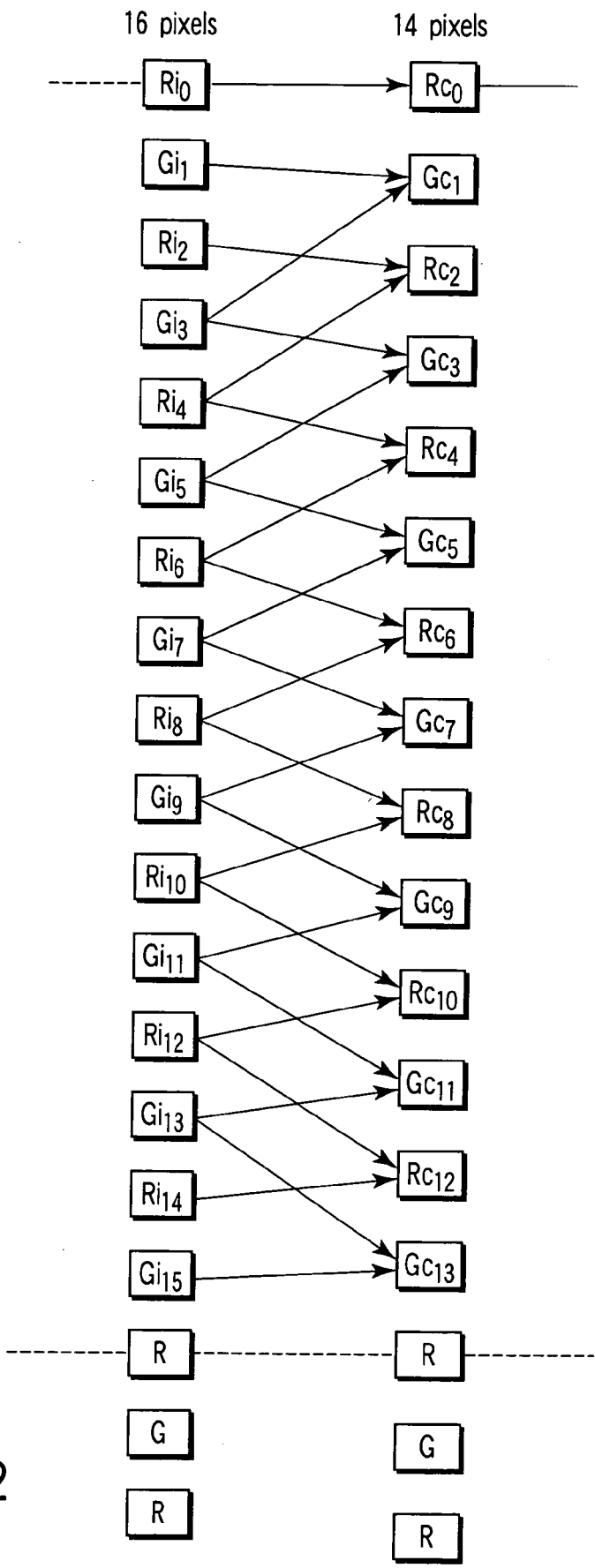
FIG. 2 is a view showing an example in which an image having an RG/GB Bayer matrix is subjected to 14/16 reduction conversion in the vertical direction.
Figure 15:
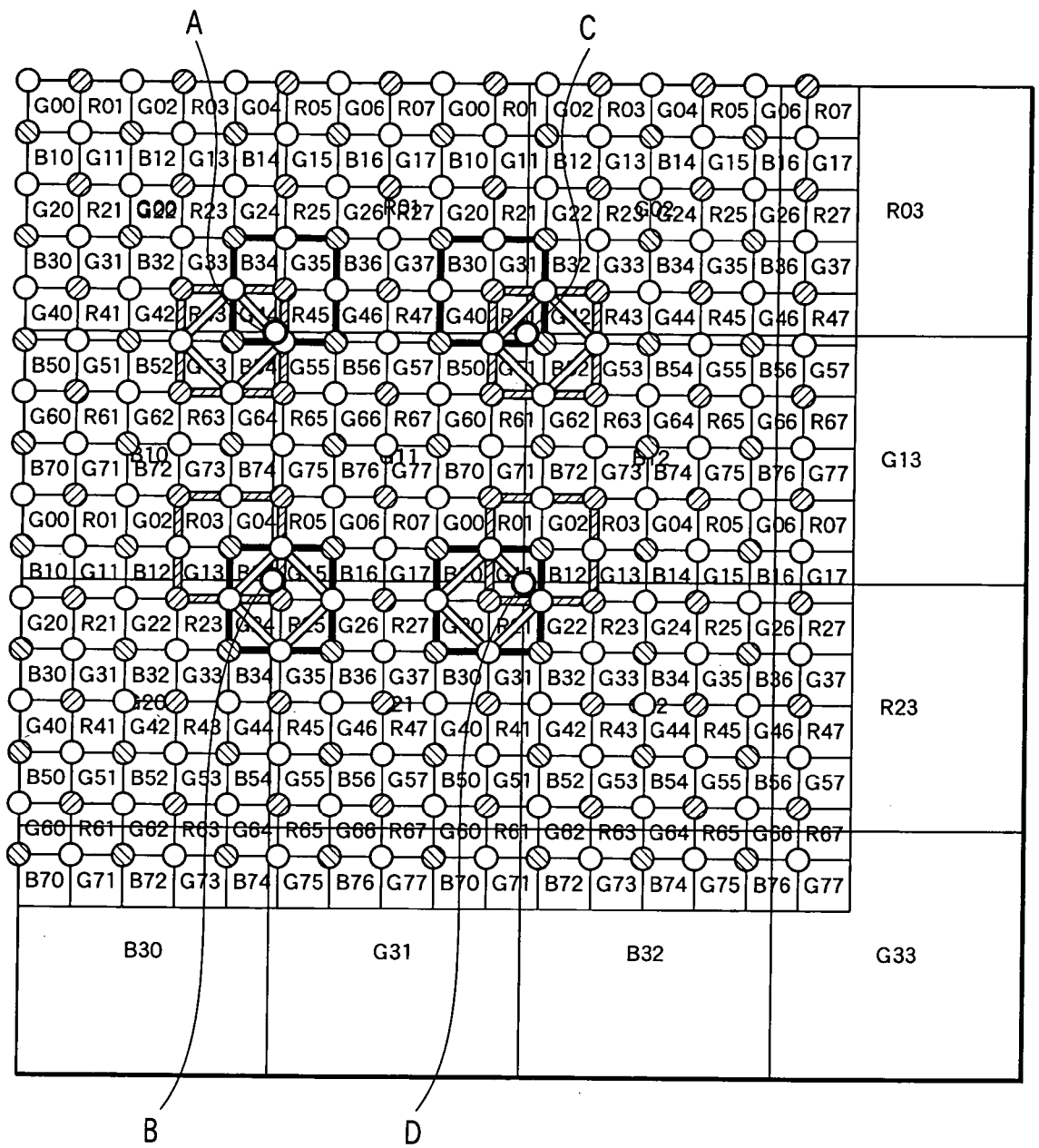
FIG. 15 is a view showing a state in which a full-color reduced image is generated from a Bayer matrix by bilinear interpolation sampling.
Figure 16:
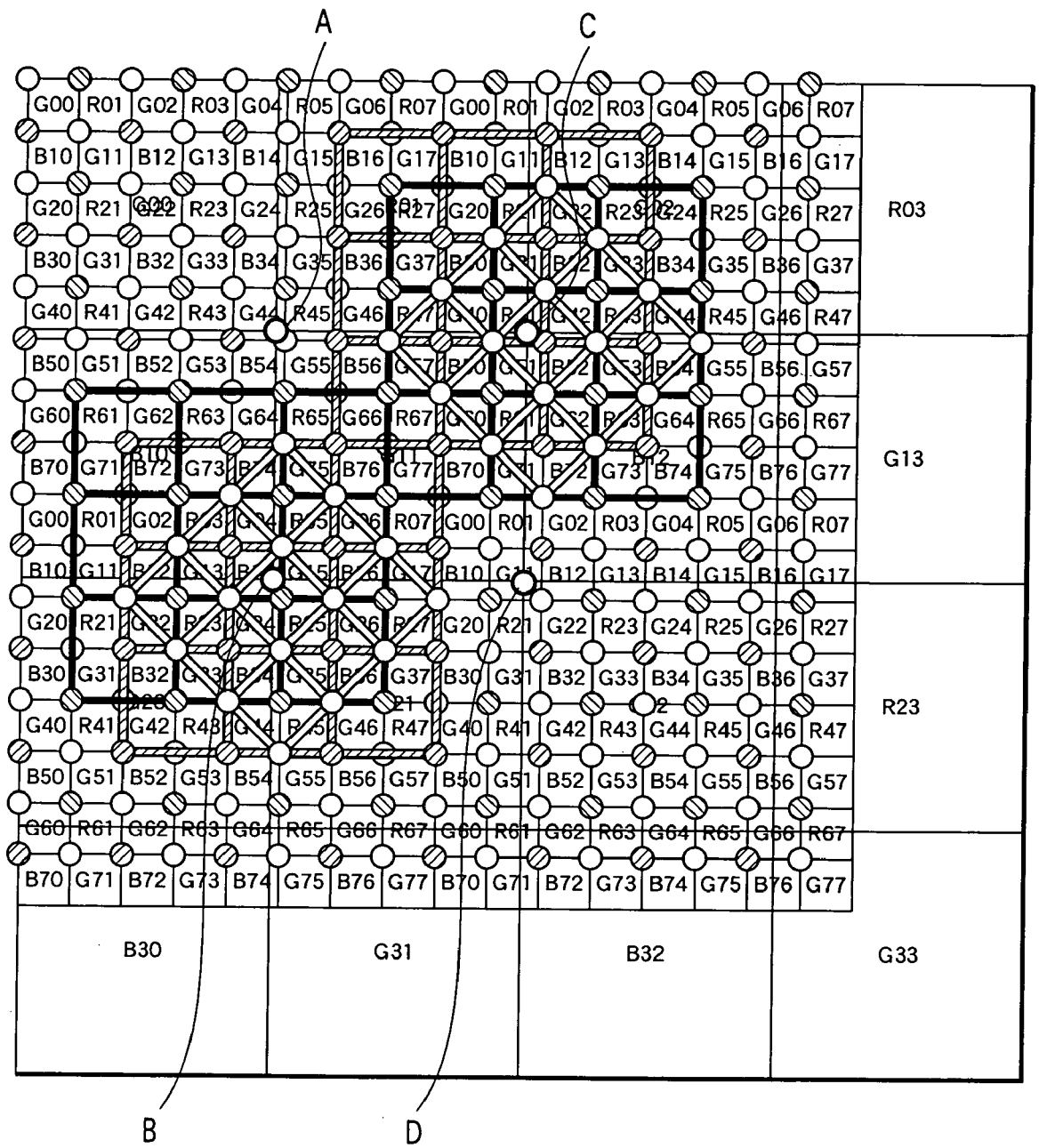
FIG. 16 is a view showing a state in which a full-color reduced image is generated from a Bayer matrix by bicubic interpolation sampling.

In the above-described bilinear interpolation (FIG. 15), when the size conversion is limited to a rational number (integral ratio), and linear interpolation is repeated twice, the algorithm is simplified. FIG. 2 shows an example in which an image having an RG/GB Bayer matrix is subjected to 14/16 reduction conversion in the horizontal direction. Referring to FIG. 2, the upper stage indicates a one-dimensional data array of pixels before reduction conversion, and the lower stage indicates a one-dimensional data array of pixels after reduction conversion.

This conversion can be expressed by a matrix given by $$\begin{pmatrix} Rc_0 \\ Gc_1 \\ Rc_2 \\ Gc_3 \\ Rc_4 \\ Gc_5 \\ Rc_6 \\ Gc_7 \\ Rc_8 \\ Gc_9 \\ Rc_{10} \\ Gc_{11} \\ Rc_{12} \\ Gc_{13} \end{pmatrix} = \begin{pmatrix} 1 & 0 & 0 & 0 & 0 & 0 & 0 & 0 & 0 & 0 & 0 & 0 & 0 & 0 & 0 & 0 \\ 0 & \frac{13}{14} & 0 & \frac{1}{14} & 0 & 0 & 0 & 0 & 0 & 0 & 0 & 0 & 0 & 0 & 0 & 0 \\ 0 & 0 & \frac{12}{14} & 0 & \frac{2}{14} & 0 & 0 & 0 & 0 & 0 & 0 & 0 & 0 & 0 & 0 & 0 \\ 0 & 0 & 0 & \frac{11}{14} & 0 & \frac{3}{14} & 0 & 0 & 0 & 0 & 0 & 0 & 0 & 0 & 0 & 0 \\ 0 & 0 & 0 & 0 & \frac{10}{14} & 0 & \frac{4}{14} & 0 & 0 & 0 & 0 & 0 & 0 & 0 & 0 & 0 \\ 0 & 0 & 0 & 0 & 0 & \frac{9}{14} & 0 & \frac{5}{14} & 0 & 0 & 0 & 0 & 0 & 0 & 0 & 0 \\ 0 & 0 & 0 & 0 & 0 & 0 & \frac{8}{14} & 0 & \frac{6}{14} & 0 & 0 & 0 & 0 & 0 & 0 & 0 \\ 0 & 0 & 0 & 0 & 0 & 0 & 0 & \frac{7}{14} & 0 & \frac{7}{14} & 0 & 0 & 0 & 0 & 0 & 0 \\ 0 & 0 & 0 & 0 & 0 & 0 & 0 & 0 & \frac{6}{14} & 0 & \frac{8}{14} & 0 & 0 & 0 & 0 & 0 \\ 0 & 0 & 0 & 0 & 0 & 0 & 0 & 0 & 0 & \frac{5}{14} & 0 & \frac{9}{14} & 0 & 0 & 0 & 0 \\ 0 & 0 & 0 & 0 & 0 & 0 & 0 & 0 & 0 & 0 & \frac{4}{14} & 0 & \frac{10}{14} & 0 & 0 & 0 \\ 0 & 0 & 0 & 0 & 0 & 0 & 0 & 0 & 0 & 0 & 0 & \frac{3}{14} & 0 & \frac{11}{14} & 0 & 0 \\ 0 & 0 & 0 & 0 & 0 & 0 & 0 & 0 & 0 & 0 & 0 & 0 & \frac{2}{14} & 0 & \frac{12}{14} & 0 \\ 0 & 0 & 0 & 0 & 0 & 0 & 0 & 0 & 0 & 0 & 0 & 0 & 0 & \frac{1}{14} & 0 & \frac{13}{14} \end{pmatrix} \begin{pmatrix} Ri_0 \\ Gi_1 \\ Ri_2 \\ Gi_3 \\ Ri_4 \\ Gi_5 \\ Ri_6 \\ Gi_7 \\ Ri_8 \\ Gi_9 \\ Ri_{10} \\ Gi_{11} \\ Ri_{12} \\ Gi_{13} \\ Ri_{14} \\ Gi_{15} \end{pmatrix} \quad (1)$$

In equation (1), $Ri_{2p}$ and $Gi_{2p+1}$ ($p$ is an integer; $0 \leq p < 7$) represent pixel data of pixels continuously arrayed in the horizontal direction in the photoelectric conversion element 122 and have consecutive subscripts corresponding to the positions of the pixels arrayed in the horizontal direction. $Rc_{2q}$ and $Gc_{2q+1}$ ($q$ is an integer; $0 \leq q < 6$) represent pixel data after conversion and have consecutive subscripts corresponding to the positions of the pixels arrayed in the horizontal direction.

For example, using $Ri_2$ and $Ri_4$, $Rc_2$ after conversion is given by $$Rc_2 = \frac{12}{14} Ri_2 + \frac{2}{14} Ri_4. \tag{2}$$

Equation (1) generally expresses the conversion from 16 pixels to 14 pixels, in which each pixel is converted in the above-described manner.

Figure 3:
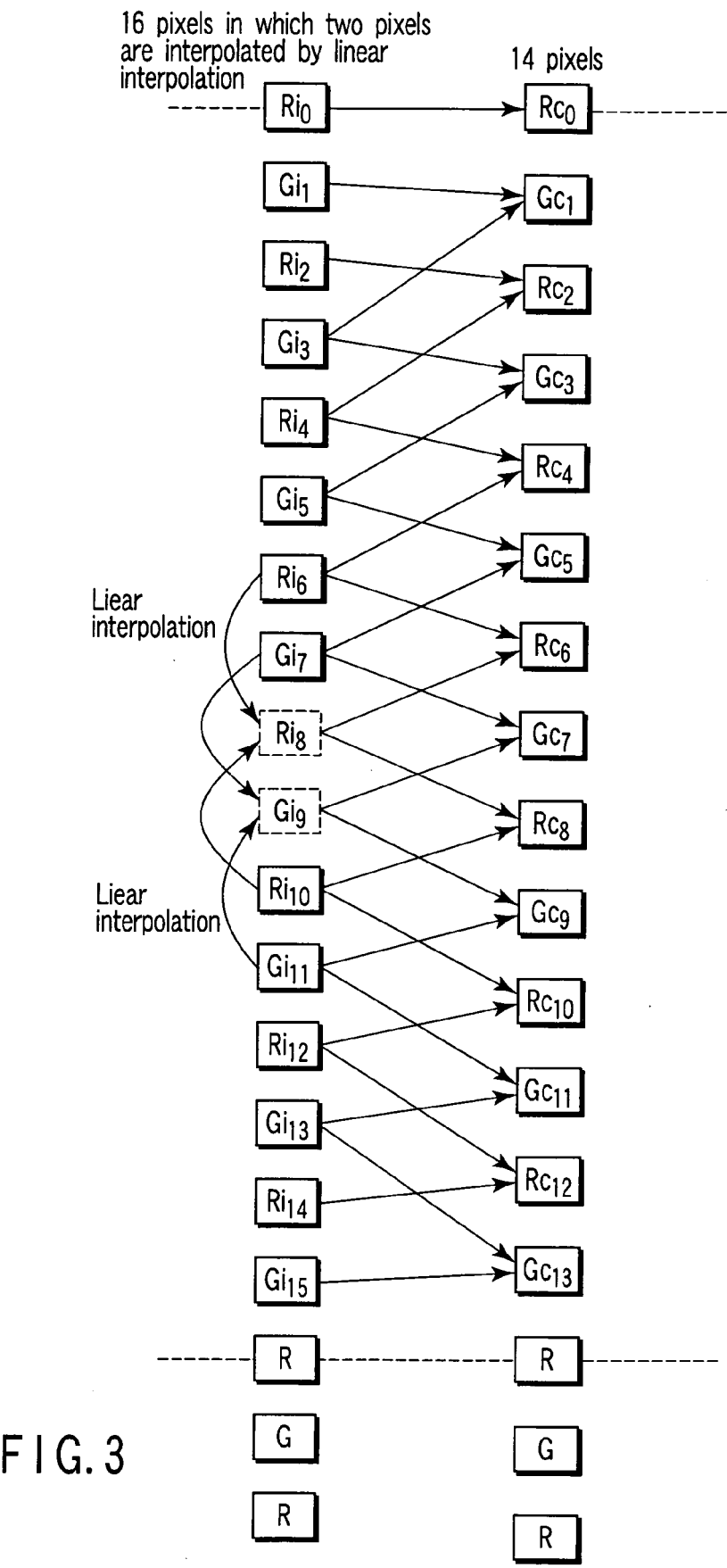
FIG. 3 is a view showing a state in which of 16 pixels before conversion, the eighth and ninth pixel data from the upper side are omitted in the conversion shown in FIG. 2.

FIG. 3 shows a state in which of the 16 pixels before conversion, the eighth and ninth pixel data from the left side are omitted in the conversion shown in FIG. 2. In this case, omitted pixel data $Ri_8$ and $Gi_9$ are linearly interpolated by using pixel data $Ri_6$ and $Ri_{10}$ and pixel data $Gi_9$ and $Gi_{11}$ of the same channel in accordance with $$Ri_8 = \frac{Ri_6 + Ri_{10}}{2}, \quad Gi_9 = \frac{Gi_7 + Gi_{11}}{2}. \tag{3}$$

When $Ri_8$ and $Gi_9$ in equation (1) are replaced in accordance with equation (3), we obtain $$\begin{pmatrix} Rc_0 \\ Gc_1 \\ Rc_2 \\ Gc_3 \\ Rc_4 \\ Gc_5 \\ Rc_6 \\ Gc_7 \\ Rc_8 \\ Gc_9 \\ Rc_{10} \\ Gc_{11} \\ Rc_{12} \\ Gc_{13} \end{pmatrix} = \begin{pmatrix} 1 & 0 & 0 & 0 & 0 & 0 & 0 & 0 & 0 & 0 & 0 & 0 & 0 & 0 & 0 & 0 \\ 0 & \frac{13}{14} & 0 & \frac{1}{14} & 0 & 0 & 0 & 0 & 0 & 0 & 0 & 0 & 0 & 0 & 0 & 0 \\ 0 & 0 & \frac{12}{14} & 0 & \frac{2}{14} & 0 & 0 & 0 & 0 & 0 & 0 & 0 & 0 & 0 & 0 & 0 \\ 0 & 0 & 0 & \frac{11}{14} & 0 & \frac{3}{14} & 0 & 0 & 0 & 0 & 0 & 0 & 0 & 0 & 0 & 0 \\ 0 & 0 & 0 & 0 & \frac{10}{14} & 0 & \frac{4}{14} & 0 & 0 & 0 & 0 & 0 & 0 & 0 & 0 & 0 \\ 0 & 0 & 0 & 0 & 0 & \frac{9}{14} & 0 & \frac{5}{14} & 0 & 0 & 0 & 0 & 0 & 0 & 0 & 0 \\ 0 & 0 & 0 & 0 & 0 & 0 & \frac{8}{14} & 0 & \frac{6}{14} & 0 & 0 & 0 & 0 & 0 & 0 & 0 \\ 0 & 0 & 0 & 0 & 0 & 0 & \frac{7}{14} & 0 & \frac{7}{14} & 0 & 0 & 0 & 0 & 0 & 0 & 0 \\ 0 & 0 & 0 & 0 & 0 & 0 & 0 & \frac{6}{14} & 0 & \frac{8}{14} & 0 & 0 & 0 & 0 & 0 & 0 \\ 0 & 0 & 0 & 0 & 0 & 0 & 0 & 0 & \frac{5}{14} & 0 & \frac{9}{14} & 0 & 0 & 0 & 0 & 0 \\ 0 & 0 & 0 & 0 & 0 & 0 & 0 & 0 & 0 & \frac{4}{14} & 0 & \frac{10}{14} & 0 & 0 & 0 & 0 \\ 0 & 0 & 0 & 0 & 0 & 0 & 0 & 0 & 0 & 0 & \frac{3}{14} & 0 & \frac{11}{14} & 0 & 0 & 0 \\ 0 & 0 & 0 & 0 & 0 & 0 & 0 & 0 & 0 & 0 & 0 & \frac{2}{14} & 0 & \frac{12}{14} & 0 & 0 \\ 0 & 0 & 0 & 0 & 0 & 0 & 0 & 0 & 0 & 0 & 0 & 0 & \frac{1}{14} & 0 & \frac{13}{14} & 0 \end{pmatrix} \begin{pmatrix} Ri_0 \\ Gi_1 \\ Ri_2 \\ Gi_3 \\ Ri_4 \\ Gi_5 \\ Ri_6 \\ Gi_7 \\ \frac{Ri_6 + Ri_{10}}{2} \\ \frac{Gi_7 + Gi_{11}}{2} \\ Ri_{10} \\ Gi_{11} \\ Ri_{12} \\ Gi_{13} \\ Ri_{14} \\ Gi_{15} \end{pmatrix}. \tag{4}$$

Sixteen data arrays $Ri_0, Gi_1, \ldots, Ri_{14}$, and $Gi_{15}$ on the right-hand side of equation (4) can be expressed by $$\begin{pmatrix} Ri_0 \\ Gi_1 \\ Ri_2 \\ Gi_3 \\ Ri_4 \\ Gi_5 \\ Ri_6 \\ Gi_7 \\ \frac{Ri_6 + Ri_{10}}{2} \\ \frac{Gi_7 + Gi_{11}}{2} \\ Ri_{10} \\ Gi_{11} \\ Ri_{12} \\ Gi_{13} \\ Ri_{14} \\ Gi_{15} \end{pmatrix} = \begin{pmatrix} 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 \\ 0 & 0 & 0 & 0 & 0 & 0 & 0 & 1 & 0 & 0 & 0 & 0 & 0 & 0 \\ 0 & 0 & 0 & 0 & 0 & 0 & \frac{1}{2} & 0 & \frac{1}{2} & 0 & 0 & 0 & 0 & 0 \\ 0 & 0 & 0 & 0 & 0 & 0 & 0 & \frac{1}{2} & 0 & \frac{1}{2} & 0 & 0 & 0 & 0 \\ 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 1 \end{pmatrix} \begin{pmatrix} Ri_0 \\ Gi_1 \\ Ri_2 \\ Gi_3 \\ Ri_4 \\ Gi_5 \\ Ri_6 \\ Gi_7 \\ Ri_{10} \\ Gi_{11} \\ Ri_{12} \\ Gi_{13} \\ Ri_{14} \\ Gi_{15} \end{pmatrix}. \quad (5)$$

When this is substituted into equation (4), we obtain $$\begin{pmatrix} Rc_0 \\ Gc_1 \\ Rc_2 \\ Gc_3 \\ Rc_4 \\ Gc_5 \\ Rc_6 \\ Gc_7 \\ Rc_8 \\ Gc_9 \\ Rc_{10} \\ Gc_{11} \\ Rc_{12} \\ Gc_{13} \end{pmatrix} = \begin{pmatrix} 1 & 0 & 0 & 0 & 0 & 0 & 0 & 0 & 0 & 0 & 0 & 0 & 0 & 0 & 0 & 0 \\ 0 & \frac{13}{14} & 0 & \frac{1}{14} & 0 & 0 & 0 & 0 & 0 & 0 & 0 & 0 & 0 & 0 \\ 0 & 0 & \frac{12}{14} & 0 & \frac{2}{14} & 0 & 0 & 0 & 0 & 0 & 0 & 0 & 0 & 0 \\ 0 & 0 & 0 & \frac{11}{14} & 0 & \frac{3}{14} & 0 & 0 & 0 & 0 & 0 & 0 & 0 & 0 \\ 0 & 0 & 0 & 0 & \frac{10}{14} & 0 & \frac{4}{14} & 0 & 0 & 0 & 0 & 0 & 0 & 0 \\ 0 & 0 & 0 & 0 & 0 & \frac{9}{14} & 0 & \frac{5}{14} & 0 & 0 & 0 & 0 & 0 & 0 \\ 0 & 0 & 0 & 0 & 0 & \frac{8}{14} & 0 & \frac{6}{14} & 0 & 0 & 0 & 0 & 0 & 0 \\ 0 & 0 & 0 & 0 & 0 & 0 & \frac{7}{14} & 0 & \frac{7}{14} & 0 & 0 & 0 & 0 & 0 \\ 0 & 0 & 0 & 0 & 0 & 0 & \frac{6}{14} & 0 & \frac{8}{14} & 0 & 0 & 0 & 0 & 0 \\ 0 & 0 & 0 & 0 & 0 & 0 & 0 & \frac{5}{14} & 0 & \frac{9}{14} & 0 & 0 & 0 & 0 \\ 0 & 0 & 0 & 0 & 0 & 0 & 0 & 0 & \frac{4}{14} & 0 & \frac{10}{14} & 0 & 0 & 0 \\ 0 & 0 & 0 & 0 & 0 & 0 & 0 & 0 & 0 & \frac{3}{14} & 0 & \frac{11}{14} & 0 & 0 \\ 0 & 0 & 0 & 0 & 0 & 0 & 0 & 0 & 0 & \frac{2}{14} & 0 & \frac{12}{14} & 0 \\ 0 & 0 & 0 & 0 & 0 & 0 & 0 & 0 & 0 & 0 & 0 & \frac{1}{14} & 0 & \frac{13}{14} \end{pmatrix} \begin{pmatrix} 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 \\ 0 & 0 & 0 & 0 & 0 & 0 & 0 & 1 & 0 & 0 & 0 & 0 & 0 & 0 \\ 0 & 0 & 0 & 0 & 0 & 0 & \frac{1}{2} & 0 & \frac{1}{2} & 0 & 0 & 0 & 0 & 0 \\ 0 & 0 & 0 & 0 & 0 & 0 & 0 & \frac{1}{2} & 0 & \frac{1}{2} & 0 & 0 & 0 & 0 \\ 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 1 & 0 \\ 0 & 0 & 0 & 0 & 0 & 0 & 0 & 0 & 0 & 0 & 0 & 0 & 0 & 1 \end{pmatrix} \begin{pmatrix} Ri_0 \\ Gi_1 \\ Ri_2 \\ Gi_3 \\ Ri_4 \\ Gi_5 \\ Ri_6 \\ Gi_7 \\ Ri_{10} \\ Gi_{11} \\ Ri_{12} \\ Gi_{13} \\ Ri_{14} \\ Gi_{15} \end{pmatrix}. \quad (6)$$

When the product of the matrix in equation (6) is calculated, we obtain $$\begin{pmatrix} Rc_0 \\ Gc_1 \\ Rc_2 \\ Gc_3 \\ Rc_4 \\ Gc_5 \\ Rc_6 \\ Gc_7 \\ Rc_8 \\ Gc_9 \\ Rc_{10} \\ Gc_{11} \\ Rc_{12} \\ Gc_{13} \end{pmatrix} = \begin{pmatrix} 1 & 0 & 0 & 0 & 0 & 0 & 0 & 0 & 0 & 0 & 0 & 0 & 0 & 0 \\ 0 & \frac{13}{14} & 0 & \frac{1}{14} & 0 & 0 & 0 & 0 & 0 & 0 & 0 & 0 & 0 & 0 \\ 0 & 0 & \frac{12}{14} & 0 & \frac{2}{14} & 0 & 0 & 0 & 0 & 0 & 0 & 0 & 0 & 0 \\ 0 & 0 & 0 & \frac{11}{14} & 0 & \frac{3}{14} & 0 & 0 & 0 & 0 & 0 & 0 & 0 & 0 \\ 0 & 0 & 0 & 0 & \frac{10}{14} & 0 & \frac{4}{14} & 0 & 0 & 0 & 0 & 0 & 0 & 0 \\ 0 & 0 & 0 & 0 & 0 & \frac{9}{14} & 0 & \frac{5}{14} & 0 & 0 & 0 & 0 & 0 & 0 \\ 0 & 0 & 0 & 0 & 0 & 0 & \frac{11}{14} & 0 & \frac{3}{14} & 0 & 0 & 0 & 0 & 0 \\ 0 & 0 & 0 & 0 & 0 & 0 & 0 & \frac{21}{28} & 0 & \frac{7}{28} & 0 & 0 & 0 & 0 \\ 0 & 0 & 0 & 0 & 0 & 0 & \frac{3}{14} & 0 & \frac{11}{14} & 0 & 0 & 0 & 0 & 0 \\ 0 & 0 & 0 & 0 & 0 & 0 & 0 & \frac{5}{28} & 0 & \frac{23}{28} & 0 & 0 & 0 & 0 \\ 0 & 0 & 0 & 0 & 0 & 0 & 0 & 0 & \frac{4}{14} & 0 & \frac{10}{14} & 0 & 0 & 0 \\ 0 & 0 & 0 & 0 & 0 & 0 & 0 & 0 & 0 & \frac{3}{14} & 0 & \frac{11}{14} & 0 & 0 \\ 0 & 0 & 0 & 0 & 0 & 0 & 0 & 0 & 0 & 0 & \frac{2}{14} & 0 & \frac{12}{14} & 0 \\ 0 & 0 & 0 & 0 & 0 & 0 & 0 & 0 & 0 & 0 & 0 & \frac{1}{14} & 0 & \frac{13}{14} \end{pmatrix} \begin{pmatrix} Ri_0 \\ Gi_1 \\ Ri_2 \\ Gi_3 \\ Ri_4 \\ Gi_5 \\ Ri_6 \\ Gi_7 \\ Ri_{10} \\ Gi_{11} \\ Ri_{12} \\ Gi_{13} \\ Ri_{14} \\ Gi_{15} \end{pmatrix} \quad (7)$$

This conversion is equivalent to equation (4) and has 14 pixel data outputs corresponding to 14 pixel data inputs. In other words, this conversion obtains 14 pixel data after 14/16 reduction conversion from the 14 pixel data except the pixel data $Ri_8$ and $Gi_9$.

Figure 4:
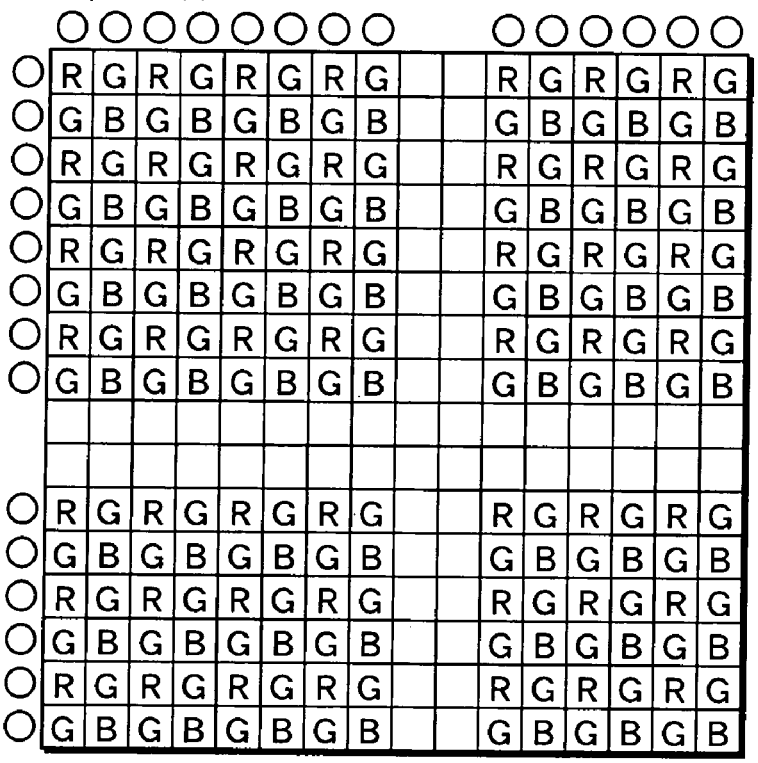
FIG. 4 is a view showing an example in which two of 16 pixels are thinned out in both the horizontal and vertical directions.

FIG. 4 shows an example in which two of 16 pixels are thinned out in both the horizontal and vertical directions. In this example, the eighth and ninth pixels are thinned out in both the horizontal and vertical directions.

Figure 5:
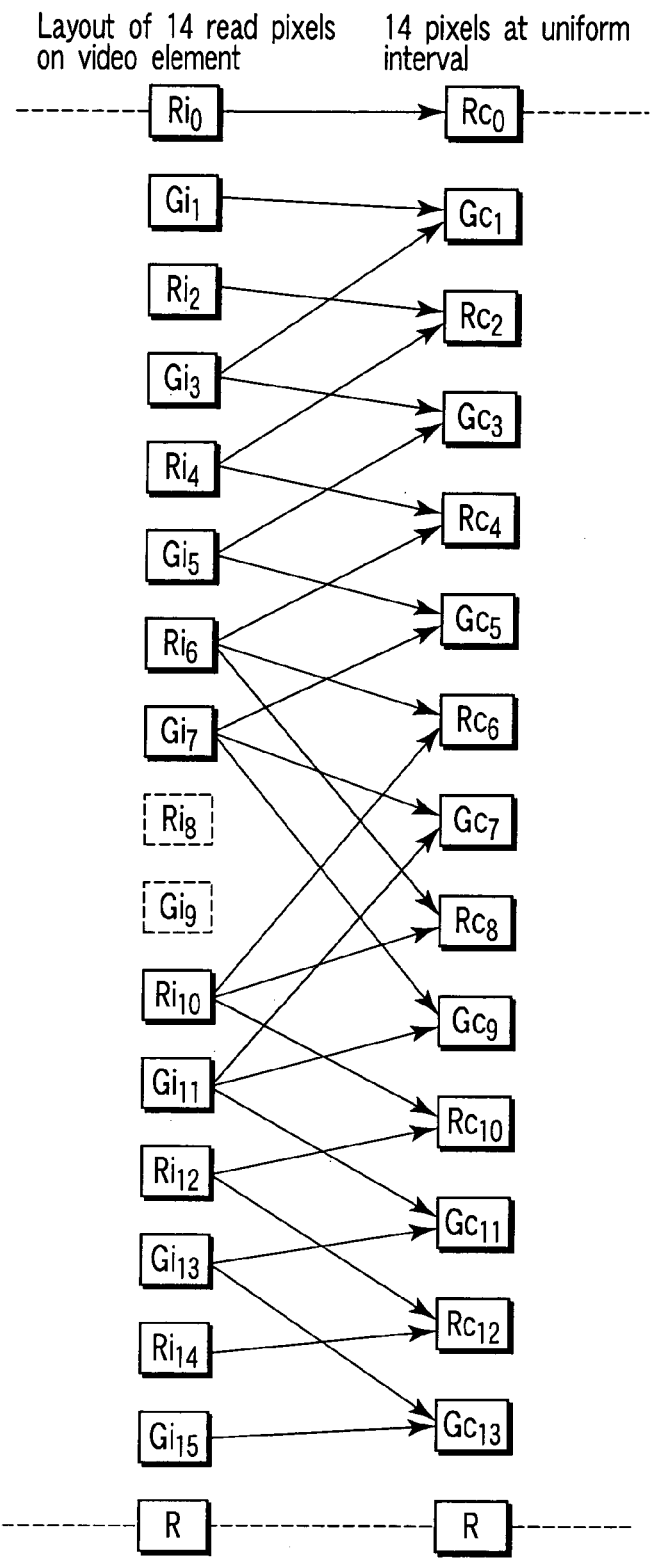
FIG. 5 is a view showing distortion correction conversion of the data of the first column on the left side of the pixel data which is thinned out according to the example shown in FIG. 4.

FIG. 5 shows conversion of the first column on the left side of the pixel data which is thinned out according to the example shown in FIG. 4. As shown in FIG. 5, actually read pixel data are 14 data $Ri_0$, $Gi_1$, $Ri_2$, $Gi_3$, $Ri_4$, $Gi_5$, $Ri_6$, $Gi_7$, $Ri_{10}$, $Gi_{11}$, $Ri_{12}$, $Gi_{13}$, $Ri_{14}$, and $Gi_{15}$ in the vertical direction.

Equation (7) is equivalent to conversion which obtains 14 pixel data after 14/16 reduction conversion from the 14 pixel data except the thinned eighth (eighth row) and ninth (ninth row) pixel data.

As is apparent from the equation of linear operation by the matrix expression of equation (7), since pixel thinning is executed, pixel data $Rc_6$ and $Rc_8$ at different positions after distortion correction are represented by the weighted linear sums of the original pixel data $Ri_6$ and $Ri_{10}$, which are given by $$Rc_6 = \frac{11}{14} Ri_6 + \frac{3}{14} Ri_{10} \quad (8)$$
$$Rc_8 = \frac{3}{14} Ri_6 + \frac{11}{14} Ri_{10}.$$

The pixel data used to obtain the pixel data $Rc_8$ is the same as the pixel data used to obtain the pixel data $Rc_6$. More specifically, the pixel data used to obtain the pixel data $Rc_8$ is different from the order of pixel data used to obtain the pixel data $Rc_1$ to $Rc_6$ before that (i.e., the phase is shifted). This also applies to the pixel data $Gc_7$ and $Gc_9$.

As shown in FIG. 5, actually read pixel data are the 14 data $Ri_0$, $Gi_1$, $Ri_2$, $Gi_3$, $Ri_4$, $Gi_5$, $Ri_6$, $Gi_7$, $Ri_{10}$, $Gi_{11}$, $Ri_{12}$, $Gi_{13}$, $Ri_{14}$, and $Gi_{15}$. These data are given by $Rj_0$, $Gj_1$, $Rj_2$, $Gj_3$, $Rj_4$, $Gj_5$, $Rj_6$, $Gj_7$, $Rj_8$, $Gj_9$, $Rj_{10}$, $Gj_{11}$, $Rj_{12}$, and $Gj_{13}$. That is, $$\begin{pmatrix} Ri_0 \\ Gi_1 \\ Ri_2 \\ Gi_3 \\ Ri_4 \\ Gi_5 \\ Ri_6 \\ Gi_7 \\ Ri_{10} \\ Gi_{11} \\ Ri_{12} \\ Gi_{13} \\ Ri_{14} \\ Gi_{15} \end{pmatrix} = \begin{pmatrix} Rj_0 \\ Gj_1 \\ Rj_2 \\ Gj_3 \\ Rj_4 \\ Gj_5 \\ Rj_6 \\ Gj_7 \\ Rj_8 \\ Gj_9 \\ Rj_{10} \\ Gj_{11} \\ Rj_{12} \\ Gj_{13} \end{pmatrix} \quad (9)$$

As described above, $Ri_{2p}$ and $Gi_{2p+1}$ (p is an integer; $0 \leq p < 7$) represent pixel data of pixels arrayed in the horizontal direction in the photoelectric conversion element 122. Inconsecutive subscripts represent data which are thinned out in the read. $Rj_{2r}$ and $Gj_{2r+1}$ (r is an integer; $0 \leq q < 6$) represent pixel data which are actually read by the pixel thinning read and have consecutive subscripts corresponding to the read order.

When equation (9) is substituted into equation (7), we obtain $$\begin{pmatrix} Rc_0 \\ Gc_1 \\ Rc_2 \\ Gc_3 \\ Rc_4 \\ Gc_5 \\ Rc_6 \\ Gc_7 \\ Rc_8 \\ Gc_9 \\ Rc_{10} \\ Gc_{11} \\ Rc_{12} \\ Gc_{13} \end{pmatrix} = \begin{pmatrix} 1 & 0 & 0 & 0 & 0 & 0 & 0 & 0 & 0 & 0 & 0 & 0 & 0 & 0 \\ 0 & \frac{13}{14} & 0 & \frac{1}{14} & 0 & 0 & 0 & 0 & 0 & 0 & 0 & 0 & 0 & 0 \\ 0 & 0 & \frac{12}{14} & 0 & \frac{2}{14} & 0 & 0 & 0 & 0 & 0 & 0 & 0 & 0 & 0 \\ 0 & 0 & 0 & \frac{11}{14} & 0 & \frac{3}{14} & 0 & 0 & 0 & 0 & 0 & 0 & 0 & 0 \\ 0 & 0 & 0 & 0 & \frac{10}{14} & 0 & \frac{4}{14} & 0 & 0 & 0 & 0 & 0 & 0 & 0 \\ 0 & 0 & 0 & 0 & 0 & \frac{9}{14} & 0 & \frac{5}{14} & 0 & 0 & 0 & 0 & 0 & 0 \\ 0 & 0 & 0 & 0 & 0 & 0 & \frac{11}{14} & 0 & \frac{3}{14} & 0 & 0 & 0 & 0 & 0 \\ 0 & 0 & 0 & 0 & 0 & 0 & 0 & \frac{21}{28} & 0 & \frac{7}{28} & 0 & 0 & 0 & 0 \\ 0 & 0 & 0 & 0 & 0 & 0 & \frac{3}{14} & 0 & \frac{11}{14} & 0 & 0 & 0 & 0 & 0 \\ 0 & 0 & 0 & 0 & 0 & 0 & 0 & \frac{5}{28} & 0 & \frac{23}{28} & 0 & 0 & 0 & 0 \\ 0 & 0 & 0 & 0 & 0 & 0 & 0 & 0 & \frac{4}{14} & 0 & \frac{10}{14} & 0 & 0 & 0 \\ 0 & 0 & 0 & 0 & 0 & 0 & 0 & 0 & 0 & \frac{3}{14} & 0 & \frac{11}{14} & 0 & 0 \\ 0 & 0 & 0 & 0 & 0 & 0 & 0 & 0 & 0 & 0 & \frac{2}{14} & 0 & \frac{12}{14} & 0 \\ 0 & 0 & 0 & 0 & 0 & 0 & 0 & 0 & 0 & 0 & 0 & \frac{1}{14} & 0 & \frac{13}{14} \end{pmatrix} \begin{pmatrix} Rj_0 \\ Gj_1 \\ Rj_2 \\ Gj_3 \\ Rj_4 \\ Gj_5 \\ Rj_6 \\ Gj_7 \\ Rj_8 \\ Gj_9 \\ Rj_{10} \\ Gj_{11} \\ Rj_{12} \\ Gj_{13} \end{pmatrix} \quad (10)$$

This is distortion correction conversion which obtains 14 pixel data after 14/16 reduction conversion from the 14 pixel data actually sequentially read by the pixel thinning read.

The above-described linear distortion correction can be expanded to a two-dimensional array in the following way.

Equation (10) is expressed by $$C = A \cdot B \quad (11)$$

where A is the conversion matrix which executes linear distortion compensation (i.e., in the above-described example, distortion compensation for the 14 pixel data obtained by thinning two of 16 pixels), B is the n (rows)×1 (column) matrix representing pixel data before distortion compensation, and C is the n (rows)×1 (column) matrix representing pixel data after distortion compensation. The read data shown in FIG. 4 is expressed by a matrix $D_i$ given by $$D_i = \begin{pmatrix} Ri_{0,0} & Gi_{0,1} & Ri_{0,2} & Gi_{0,3} & Ri_{0,4} & Gi_{0,5} & Ri_{0,6} & Gi_{0,7} & Ri_{0,10} & Gi_{0,11} & Ri_{0,12} & Gi_{0,13} & Ri_{0,14} & Gi_{0,15} \\ Gi_{1,0} & Bi_{1,1} & Gi_{1,2} & Bi_{1,3} & Gi_{1,4} & Bi_{1,5} & Gi_{1,6} & Bi_{1,7} & Gi_{1,10} & Bi_{1,11} & Gi_{1,12} & Bi_{1,13} & Gi_{1,14} & Bi_{1,15} \\ Ri_{2,0} & Gi_{2,1} & Ri_{2,2} & Gi_{2,3} & Ri_{2,4} & Gi_{2,5} & Ri_{2,6} & Gi_{2,7} & Ri_{2,10} & Gi_{2,11} & Ri_{2,12} & Gi_{2,13} & Ri_{2,14} & Gi_{2,15} \\ Gi_{3,0} & Bi_{3,1} & Gi_{3,2} & Bi_{3,3} & Gi_{3,4} & Bi_{3,5} & Gi_{3,6} & Bi_{3,7} & Gi_{3,10} & Bi_{3,11} & Gi_{3,12} & Bi_{3,13} & Gi_{3,14} & Bi_{3,15} \\ Ri_{4,0} & Gi_{4,1} & Ri_{4,2} & Gi_{4,3} & Ri_{4,4} & Gi_{4,5} & Ri_{4,6} & Gi_{4,7} & Ri_{4,10} & Gi_{4,11} & Ri_{4,12} & Gi_{4,13} & Ri_{4,14} & Gi_{4,15} \\ Gi_{5,0} & Bi_{5,1} & Gi_{5,2} & Bi_{5,3} & Gi_{5,4} & Bi_{5,5} & Gi_{5,6} & Bi_{5,7} & Gi_{5,10} & Bi_{5,11} & Gi_{5,12} & Bi_{5,13} & Gi_{5,14} & Bi_{5,15} \\ Ri_{6,0} & Gi_{6,1} & Ri_{6,2} & Gi_{6,3} & Ri_{6,4} & Gi_{6,5} & Ri_{6,6} & Gi_{6,7} & Ri_{6,10} & Gi_{6,11} & Ri_{6,12} & Gi_{6,13} & Ri_{6,14} & Gi_{6,15} \\ Gi_{7,0} & Bi_{7,1} & Gi_{7,2} & Bi_{7,3} & Gi_{7,4} & Bi_{7,5} & Gi_{7,6} & Bi_{7,7} & Gi_{7,10} & Bi_{7,11} & Gi_{7,12} & Bi_{7,13} & Gi_{7,14} & Bi_{7,15} \\ Ri_{10,0} & Gi_{10,1} & Ri_{10,2} & Gi_{10,3} & Ri_{10,4} & Gi_{10,5} & Ri_{10,6} & Gi_{10,7} & Ri_{10,10} & Gi_{10,11} & Ri_{10,12} & Gi_{10,13} & Ri_{10,14} & Gi_{10,15} \\ Gi_{11,0} & Bi_{11,1} & Gi_{11,2} & Bi_{11,3} & Gi_{11,4} & Bi_{11,5} & Gi_{11,6} & Bi_{11,7} & Gi_{11,10} & Bi_{11,11} & Gi_{11,12} & Bi_{11,13} & Gi_{11,14} & Bi_{11,15} \\ Ri_{12,0} & Gi_{12,1} & Ri_{12,2} & Gi_{12,3} & Ri_{12,4} & Gi_{12,5} & Ri_{12,6} & Gi_{12,7} & Ri_{12,10} & Gi_{12,11} & Ri_{12,12} & Gi_{12,13} & Ri_{12,14} & Gi_{12,15} \\ Gi_{13,0} & Bi_{13,1} & Gi_{13,2} & Bi_{13,3} & Gi_{13,4} & Bi_{13,5} & Gi_{13,6} & Bi_{13,7} & Gi_{13,10} & Bi_{13,11} & Gi_{13,12} & Bi_{13,13} & Gi_{13,14} & Bi_{13,15} \\ Ri_{14,0} & Gi_{14,1} & Ri_{14,2} & Gi_{14,3} & Ri_{14,4} & Gi_{14,5} & Ri_{14,6} & Gi_{14,7} & Ri_{14,10} & Gi_{14,11} & Ri_{14,12} & Gi_{14,13} & Ri_{14,14} & Gi_{14,15} \\ Gi_{15,0} & Bi_{15,1} & Gi_{15,2} & Bi_{15,3} & Gi_{15,4} & Bi_{15,5} & Gi_{15,6} & Bi_{15,7} & Gi_{15,10} & Bi_{15,11} & Gi_{15,12} & Bi_{15,13} & Gi_{15,14} & Bi_{15,15} \end{pmatrix} \quad (12)$$

In equation (12), the omitted portion is underlined. Let $D_0$ be a uniform 14 (pixels)×14 (pixels) array. Conversion for distortion correction in the vertical direction after distortion correction in the horizontal direction is given by using A in equation (11) by $$D_c = A \cdot A^T \cdot D_i \quad (13)$$

where $A^T$ is the transpose of A.

The linear distortion conversion, i.e., rewrite from equation (4) to equation (7) can also be considered as follows.

(1) When pixel data at a position X is read, and pixel data at a position X+2 is also read, the coefficients in equation (4) are directly used as the weighting coefficients of pixel data.

(2) When the pixel data at the position X is read, and the pixel data at the position X+2 is not read, pixel data at a position X+4 is read instead. A weighting coefficient x of the pixel data at the position X is changed to x'=0.5(x+1). The weighting coefficient of the pixel data at the position X+4 is the residual of the changed coefficient x' to 1, i.e., 1-x'.

(3) When the pixel data at the position X is not read, and the pixel data at the position X+2 is read, the read position of the position X is shifted ahead by two to X-2. The weighting coefficient x of the pixel data at the position X-2 is changed to x'=0.5×. The weighting coefficient of the pixel data at the position X+2 is the residual of the changed coefficient to 1, i.e., 1-x'.

Hence, instead of executing distortion correction by making the pixel read positions correspond to the correction coefficients by using the lookup table (LUT), the distortion correction coefficients can directly be calculated from the read rule by using the arithmetic processing function of the CPU.

Generalization for Single-chip Color Image Sensing Element

Figure 6:
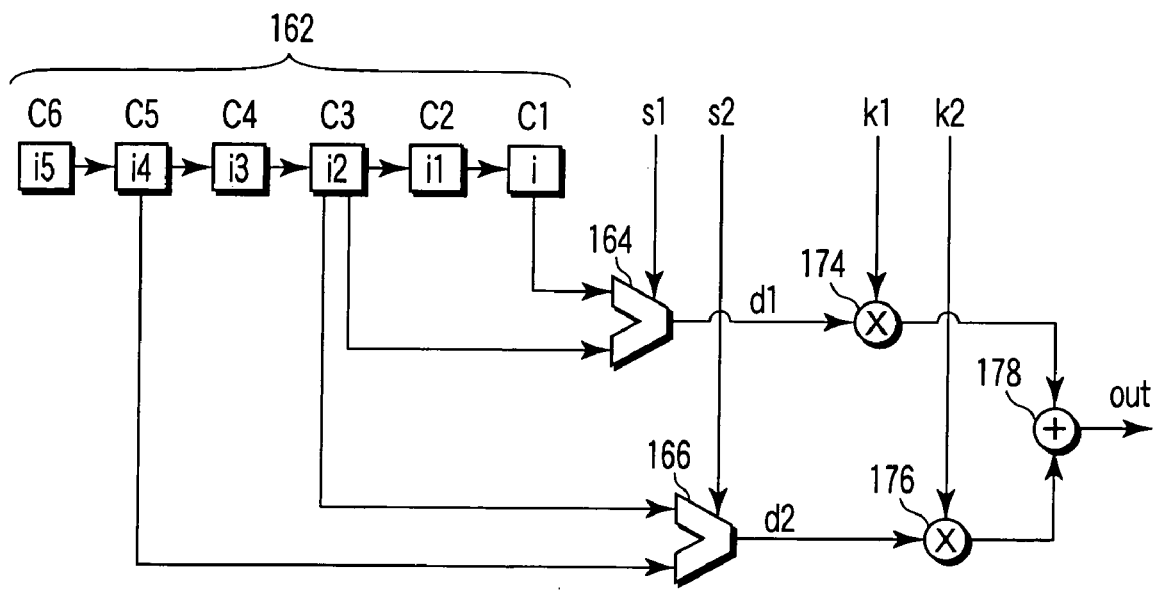
FIG. 6 is a view showing the arrangement of a filter processing unit for a photoelectric conversion element including a single-chip color image sensing element.

FIG. 6 shows the arrangement of a filter processing unit which executes, by pipeline processing, the conversion expressed by equation (7) for the photoelectric conversion element 122 including a single-chip color image sensing element having a color filter array (CFA) arranged on the front surface.

This filter processing unit has a shift register 162, two selectors 164 and 166, two multipliers 174 and 176, and an adder 178. An image signal read from the single-chip color image sensing element is input to the shift register 162. The selectors 164 and 166 select the read positions at which image signals are to be read out from the shift register 162. The multipliers 174 and 176 multiply the image signals read out from the shift register 162 by the selectors 164 and 166 by correction coefficients k1 and k2, respectively. The adder 178 adds the arithmetic results from the two multipliers 174 and 176. The filter processing unit corrects the distortion of image information read from the single-chip color image sensing element by pipeline processing in which the number of input data equals the number of output data.

Referring to FIG. 6, by using an element $b_{i,j}$ of a conversion matrix defined by equation (18) (to be described later), the distortion correction coefficients k1 and k2 and selection control signals s1 and s2 of the selectors are given as follows:

$$k_{i1} = b_{ih} | b_{i1|1<h} = 0 \quad (14)$$

where $k_{i1}$ is the non-zero element at the left end in the ith row of the matrix ($b_{i1}\|1<h=0$ represents that all of the first to hth elements in the ith row are 0);

$$k_{i2} = 1 - k_{i1} \quad (15)$$

where $k_{i2}$ is the residual of $k_{i1}$ of the matrix to 1;

$$\text{if}(i==h|bi1|1<h=0) \quad (16)$$

$$s1 = s2 = 0$$

when i=h, no read shift is present, and s1=s2=0;

$$\text{elseif}(i==h-1|b_{i1|1<h}=0) \quad (17)$$

$$s1 = s2 = 1$$

when i=h-2, two pixels are shifted in the read, and s1=s2=1. The read in FIG. 6 is switched in this way.

The number of selectors is increased in accordance with the shift amount (i-h) of the read (FIG. 6 shows an example in which the shift amount corresponds to two pixels).

The subscript i represents the sequence number of pipeline processing by the filter processing unit shown in FIG. 6, and $k_{i1}$ represents the coefficient in the ith sequence. The difference between the subscripts i and j represents the selection criterion related to the position selected by the selectors 164 and 166, at which the data is to be read out from the shift register 162.

The element $b_{i,j}$ is defined by $$\begin{pmatrix} Pc_1 \\ Qc_2 \\ Pc_3 \\ Qc_4 \\ \vdots \\ \vdots \\ Pc_{n-1} \\ Qc_n \end{pmatrix} = \begin{pmatrix} b_{1,1} & b_{1,2} & b_{1,3} & b_{1,4} & \cdots & \cdots & \cdots & \cdots & \cdots & b_{1,n} \\ b_{2,1} & b_{2,2} & b_{2,3} & b_{2,4} & b_{2,5} & \cdots & \cdots & \cdots & \cdots & \vdots \\ \vdots & \ddots & \ddots & \ddots & \ddots & \ddots & \ddots & \ddots & \ddots & \vdots \\ b_{i,1} & \cdots & b_{i,i-1} & b_{i,i} & b_{i,i+1} & b_{i,i+2} & b_{i,i+3} & b_{i,i+4} & \ddots & \vdots \\ b_{i+1,1} & \cdots & b_{i+1,i-1} & b_{i+1,i} & b_{i+1,i+1} & b_{i+1,i+2} & b_{i+1,i+3} & b_{i+1,i+4} & \ddots & \vdots \\ \vdots & \cdots & \ddots & \ddots & \ddots & \ddots & \ddots & \ddots & \ddots & \vdots \\ \vdots & \cdots & \cdots & b_{n-1,n-3} & b_{n-1,n-2} & b_{n-1,n-1} & b_{n-1,n} & \cdots & \cdots & b_{n-1,n} \\ b_{n,1} & \cdots & \cdots & \cdots & b_{n-1,n-2} & b_{n,n-1} & b_{n,n} & b_{n,n+1} & \cdots & b_{n,n} \end{pmatrix} \begin{pmatrix} Pi_1 \\ Qi_2 \\ Pi_3 \\ Qi_4 \\ \vdots \\ \vdots \\ Pi_{n-1} \\ Qi_n \end{pmatrix}. \quad (18)$$

$Pi_i$ and $Qi_{i+1}$ represent the ith and (i+1)th pixel data before distortion correction, $Pc_i$ and $Qc_{i+1}$ represent pixel data after correction, and $b_{i,j}$ represents an element (distortion correction coefficient) of the distortion correction conversion matrix.

In the single-chip color image sensing element having a color filter array (CFA) arranged on the front surface, image data has Bayer matrix colors. R and Q (Pi and Qi, and Pc and Qc) have a relationship P # Q (Pi≠Qi, and Pc≠Qc). Each of them corresponds to one of the R, G, and B channels. The read continuities are classified as follows.

(1) When $Pi_i$, $Qi_{i+1}$, $Pi_{i+2}$, and $Qi_{i+3}$ are continuous data $$b_{i,i-D-2F} = a_{i,i-2F}, \; b_{i,i-D-2F+2} = 1 - b_{i,i-D-2F}$$

$$b_{i+1,i-D-2F} = a_{i,i-2F}, \; b_{i,i-D-2F+2} = 1 - b_{i+1,i-D-2F}$$

$$b_{i,j} = 0, \; j \neq i-D-2F, \; i-D-2F+2$$

$$b_{i+1,j} = 0, \; j \neq i-D-2F+1, \; i-D-2F+3 \quad (19)$$

where $a_{i,j}$ is represented by equation (23) (to be described later). D is the number of pixels which are thinned out until the ith pixel of n pixels read in m consecutive pixel blocks on the imager is read. F is the maximum integer (F≦0) smaller than Wi defined by $$Wi = \frac{n - \frac{(m-n)}{2}i}{n}. \quad (20)$$

(2) When $Pi_i$ and $Qi_{i+1}$ are two pixels before a thinned pixel $b_{i,i-D-2F} = 0.5(a_{i,i-2F}+1), b_{i,i-D-2F+2} = 1-b_{i,i-D-2F}$ $b_{i+1,i-D-2F} = 0.5(a_{i+1,i-2F+1}+1), \quad b_{i+1,i-D-2F+3} = 1-b_{i+1,i-D-2F}$ $b_{i,j} = 0, j \neq i-D-2F, i-D-2F+2$ $b_{i+1,j} = 0, j \neq i-D-2F+1, i-D-2F+3 \quad (21)$ (3) When $Pi_i$ and $Qi_{i+1}$ are two pixels after a thinned pixel $b_{i,i-D-2F} = 0.5a_{i,i-2F}, b_{i,i-D-2F+2} = 1-b_{i,i-D-2F}$ $b_{i+1,i-D-2F} = 0.5a_{i+1,i-2F+1}, b_{i+1,i-D-2F+3} = 1-b_{i+1,i-D-2F}$ $b_{i,j} = 0, j \neq i-D-2F, i-D-2F+2$ $b_{i+1,j} = 0, j \neq i-D-2F+1, i-D-2F+3 \quad (22)$ where $a_{i,j}$ is a coefficient of an n (rows)×m (columns) matrix in conversion which executes size change of n/m (n<m) by linear interpolation and is expressed by $$\begin{pmatrix} Po_1 \\ Qo_2 \\ Po_3 \\ Qo_4 \\ \vdots \\ Po_{n-1} \\ Qo_n \end{pmatrix} = \begin{pmatrix} a_{1,1} & a_{1,2} & a_{1,3} & a_{1,4} & \cdots & \cdots & \cdots & \cdots & \cdots & a_{1,m} \\ a_{2,1} & a_{2,2} & a_{2,3} & a_{2,4} & a_{2,5} & \cdots & \cdots & \cdots & \cdots \\ \vdots & \ddots & \ddots & \ddots & \ddots & \ddots & \ddots & \ddots & \vdots \\ a_{i,1} & \cdots & \cdots & a_{i,i} & a_{i,i+1} & a_{i,i+2} & a_{i,i+3} & a_{i,i+4} & \ddots & \vdots \\ a_{i+1,1} & \cdots & \cdots & a_{i+1,i} & a_{i+1,i+1} & a_{i+1,i+2} & a_{i+1,i+3} & a_{i+1,i+4} & \ddots & \vdots \\ \vdots & \cdots & \cdots & \cdots & \ddots & \ddots & \ddots & \ddots & \vdots \\ a_{n-1,1} & \cdots & \cdots & \cdots & \cdots & a_{n-1,n-1} & a_{n-1,n} & \cdots & \cdots & a_{n-1,m} \\ a_{n,1} & \cdots & \cdots & \cdots & \cdots & a_{n,n-1} & a_{n,n} & a_{n,n+1} & \cdots & a_{n,m} \end{pmatrix} \begin{pmatrix} Pi_1 \\ Qi_2 \\ Pi_3 \\ Qi_4 \\ \vdots \\ \vdots \\ \vdots \\ Pi_{m-1} \\ Qi_m \end{pmatrix} \quad (23)$$

$Pi_i$ and $Qi_{i+1}$ are the ith and (i+1)th pixel data before size change, $Po_i$ and $Qo_{i+1}$ are pixel data after change, and $a_{i,j}$ is an element (the linear interpolation coefficient of size change) of the conversion matrix.

The element $a_{i,j}$ is defined by $a_{i,i-F} = W_i', a_{i,i-F+1} = 1 - W_i', a_{i,j} = 0 j \neq i-F, i-F+1 \quad (24)$ where Wi' is given by $Wi' = Wi - F. \quad (25)$ As described above, Wi is defined by equation (20), and F is the maximum integer (F≦0) smaller than Wi. Generalization for Monochrome Image Sensing Element or Multiple-chip Color Image Sensing Element.

Figure 7:
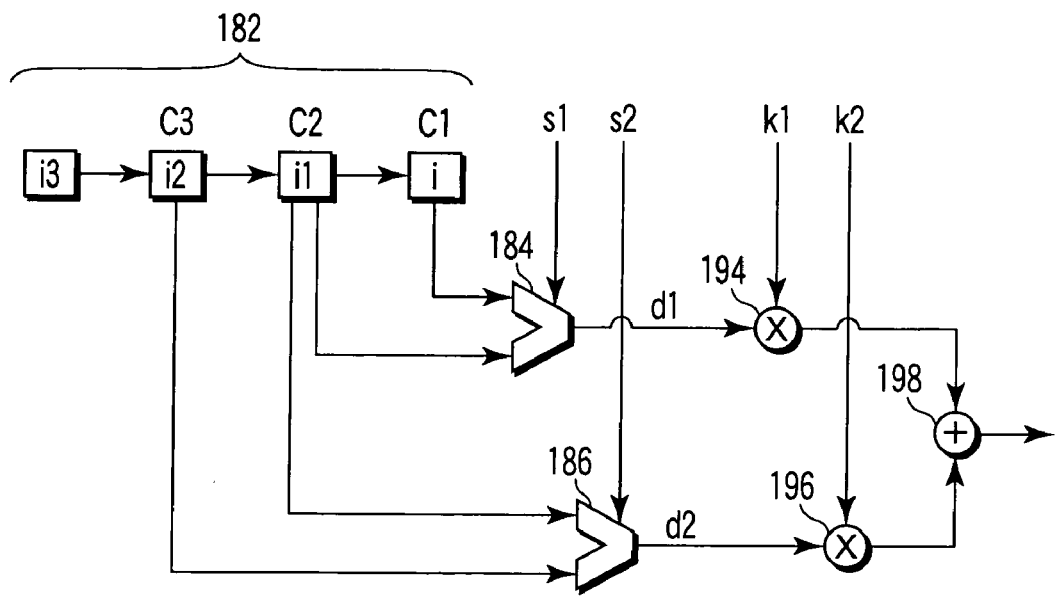
FIG. 7 is a view showing the arrangement of a filter processing unit for a photoelectric conversion element including a monochrome image sensing element or a multiple-chip color image sensing element.

FIG. 7 shows the arrangement of a filter processing unit which executes, by pipeline processing, the conversion expressed by equation (7) for the photoelectric conversion element 122 including a monochrome image sensing element or a multiple-chip color image sensing element.

This filter processing unit has a shift register 182, two selectors 184 and 186, two multipliers 194 and 196, and an adder 198. An image signal read from the monochrome image sensing element or multiple-chip color image sensing element is input to the shift register 182. The selectors 184 and 186 select the read positions at which image signals are to be read out from the shift register 182. The multipliers 194 and 196 multiply the image signals read out from the shift register 182 by the selectors 184 and 186 by the correction coefficients k1 and k2, respectively. The adder 198 adds the arithmetic results from the two multipliers 194 and 196. The filter processing unit corrects the distortion of image information read from the monochrome image sensing element or multiple-chip color image sensing element by pipeline processing in which the number of input data equals the number of output data.

Referring to FIG. 7, by using the element $b_{i,j}$ of a conversion matrix defined by equation (30) (to be described later), the distortion correction coefficients k1 and k2 and selection control signals s1 and s2 of the selectors are given as follows:

$k_{i1} = b_{ih} | b_{i1|1<h} = 0 \quad (26)$ where $k_{i1}$ is the non-zero element at the left end in the ith row of the matrix ($b_{i1} \| 1 < h = 0$ represents that all of the first to hth elements in the ith row are 0);

$k_{i2} = 1 k_{i1} \quad (27)$ where $k_{i2}$ is the residual of $k_{i1}$ of the matrix to 1;

if$(i == h | b_{i1|1<h} = 0)$ $s1 = s2 = 0 \quad (28)$ when i=h, no read shift is present, and s1=s2=0;

elseif$(i == h-1 | b_{i1|1<h} = 0)$ $s1 = s2 = 1 \quad (29)$ when i=h-2, one pixel is shifted in the read, and s1=s2=1. The read in FIG. 7 is switched in this way.

The number of selectors is increased in accordance with the shift amount (i-h) of the read (FIG. 7 shows an example in which the shift amount corresponds to one pixel).

The subscript i represents the sequence number of pipeline processing by the filter processing unit shown in FIG. 7, and $k_{i1}$ represents the coefficient in the ith sequence. The difference between the subscripts i and j represents the selection criterion related to the position selected by the selectors 184 and 186, at which the data is to be read out from the shift register 182.

The element $b_{i,j}$ is defined by $$\begin{pmatrix} Pc_1 \\ Pc_2 \\ Pc_3 \\ Pc_4 \\ \vdots \\ \vdots \\ Pc_{n-1} \\ Pc_n \end{pmatrix} = \begin{pmatrix} b_{1,1} & b_{1,2} & b_{1,3} & b_{1,4} & \cdots & \cdots & \cdots & \cdots & \cdots & b_{1,n} \\ b_{2,1} & b_{2,2} & b_{2,3} & b_{2,4} & b_{2,5} & \cdots & \cdots & \cdots & \cdots & \vdots \\ \vdots & \ddots & \ddots & \ddots & \ddots & \ddots & \ddots & \ddots & \ddots & \vdots \\ b_{i,1} & \cdots & b_{i,i-1} & b_{i,i} & b_{i,i+1} & b_{i,i+2} & b_{i,i+3} & b_{i,i+4} & \ddots & \vdots \\ b_{i+1,1} & \cdots & b_{i+1,i-1} & b_{i+1,i} & b_{i+1,i+1} & b_{i+1,i+2} & b_{i+1,i+3} & b_{i+1,i+4} & \ddots & \vdots \\ \vdots & \cdots & \ddots & \ddots & \ddots & \ddots & \ddots & \ddots & \ddots & \vdots \\ \vdots & \cdots & \cdots & b_{n-1,n-3} & b_{n-1,n-2} & b_{n-1,n-1} & b_{n-1,n} & \cdots & \cdots & b_{n-1,n} \\ b_{n,1} & \cdots & \cdots & \cdots & b_{n-1,n-2} & b_{n,n-1} & b_{n,n} & b_{n,n+1} & \cdots & b_{n,n} \end{pmatrix} \begin{pmatrix} Pi_1 \\ Pi_2 \\ Pi_3 \\ Pi_4 \\ \vdots \\ \vdots \\ Pi_{n-1} \\ Pi_n \end{pmatrix}. \quad (30)$$

$Pi_i$ represents the ith pixel data before distortion correction, $Pc_i$ represents pixel data after correction, and $b_{i,j}$ represents an element (distortion correction coefficient) of the distortion correction conversion matrix.

In the monochrome image sensing element or multiple-chip color image sensing element, the read continuities are classified as follows.

(1) When $Pi_i$ and $Pi_{i+1}$ are continuous data $$b_{i,i-D-F} = a_{i,i-F},\ b_{i,i-D-F+1} = 1 - b_{i,i-D-F}$$
$$b_{i,j} = 0,\ j \neq i-D-F,\ i-D-F+1 \quad (31)$$

where $a_{i,j}$ is represented by equation (35) (to be described later). D is the number of pixels which are thinned out until the ith pixel of n pixels read in m consecutive pixel blocks on the imager is read. F is the maximum integer ($F \leq 0$) smaller than Wi defined by $$Wi = \frac{n - (m-n)i}{n}. \quad (32)$$

(2) When $Pi_i$ is a pixel before a thinned pixel $$b_{i,i-D-F} = 0.5(a_{i,i-F}+1),\ b_{i,i-D-F+1} = 1 - b_{i,i-D-2F}$$
$$b_{i,j} = 0,\ j \neq i-D-F,\ i-D-F+1 \quad (33)$$

(3) When $Pi_i$ is a pixel after a thinned pixel $$b_{i,i-D-F} = 0.5 a_{i,i-F},\ b_{i,i-D-F+1} = 1 - b_{i,i-D-F}$$
$$b_{i,j} = 0,\ j \neq i-D-F,\ i-D-F+1 \quad (34)$$

where $a_{i,j}$ is a coefficient of an n (rows)×m (columns) matrix in conversion which executes size change of n/m (n<m) by linear interpolation and is expressed by $$\begin{pmatrix} Po_1 \\ Po_2 \\ Po_3 \\ Po_4 \\ \vdots \\ \vdots \\ Po_{n-1} \\ Po_n \end{pmatrix} = \begin{pmatrix} a_{1,1} & a_{1,2} & a_{1,3} & a_{1,4} & \cdots & \cdots & \cdots & \cdots & \cdots & a_{1,m} \\ a_{2,1} & a_{2,2} & a_{2,3} & a_{2,4} & a_{2,5} & \cdots & \cdots & \cdots & \cdots & \vdots \\ \vdots & \ddots & \ddots & \ddots & \ddots & \ddots & \ddots & \ddots & \ddots & \vdots \\ a_{i,1} & \cdots & \cdots & a_{i,i} & a_{i,i+1} & a_{i,i+2} & a_{i,i+3} & a_{i,i+4} & \ddots & \vdots \\ a_{i+1,1} & \cdots & \cdots & a_{i+1,i} & a_{i+1,i+1} & a_{i+1,i+2} & a_{i+1,i+3} & a_{i+1,i+4} & \ddots & \vdots \\ \vdots & \cdots & \cdots & \cdots & \cdots & \ddots & \ddots & \ddots & \ddots & \vdots \\ a_{n-1,1} & \cdots & \cdots & \cdots & \cdots & a_{n-1,n-1} & a_{n-1,n} & \cdots & \cdots & a_{n-1,m} \\ a_{n,1} & \cdots & \cdots & \cdots & \cdots & a_{n,n-1} & a_{n,n} & a_{n,n+1} & \cdots & a_{n,m} \end{pmatrix} \begin{pmatrix} Pi_1 \\ Pi_2 \\ Pi_3 \\ Pi_4 \\ \vdots \\ \vdots \\ Pi_{m-1} \\ Pi_m \end{pmatrix}. \quad (35)$$

$P_i$ is the ith pixel data before size change, $Po_i$ is pixel data after change, and $a_{i,j}$ is an element (the linear interpolation coefficient of size change) of the conversion matrix.

The element $a_{i,j}$ is defined by $$a_{i,i-F} = W_1', \; a_{i,i-F+1} = 1 - W_1', \; a_{i,j} = 0 \; j \neq i-F, i-F+1 \quad (36)$$

where $W_i'$ is given by $$W_{i'=Wi-F}. \quad (37)$$

As described above, Wi is defined by equation (32), and F is the maximum integer (F≦0) smaller than Wi.

Flow of Distortion Correction Processing

Figure 8:
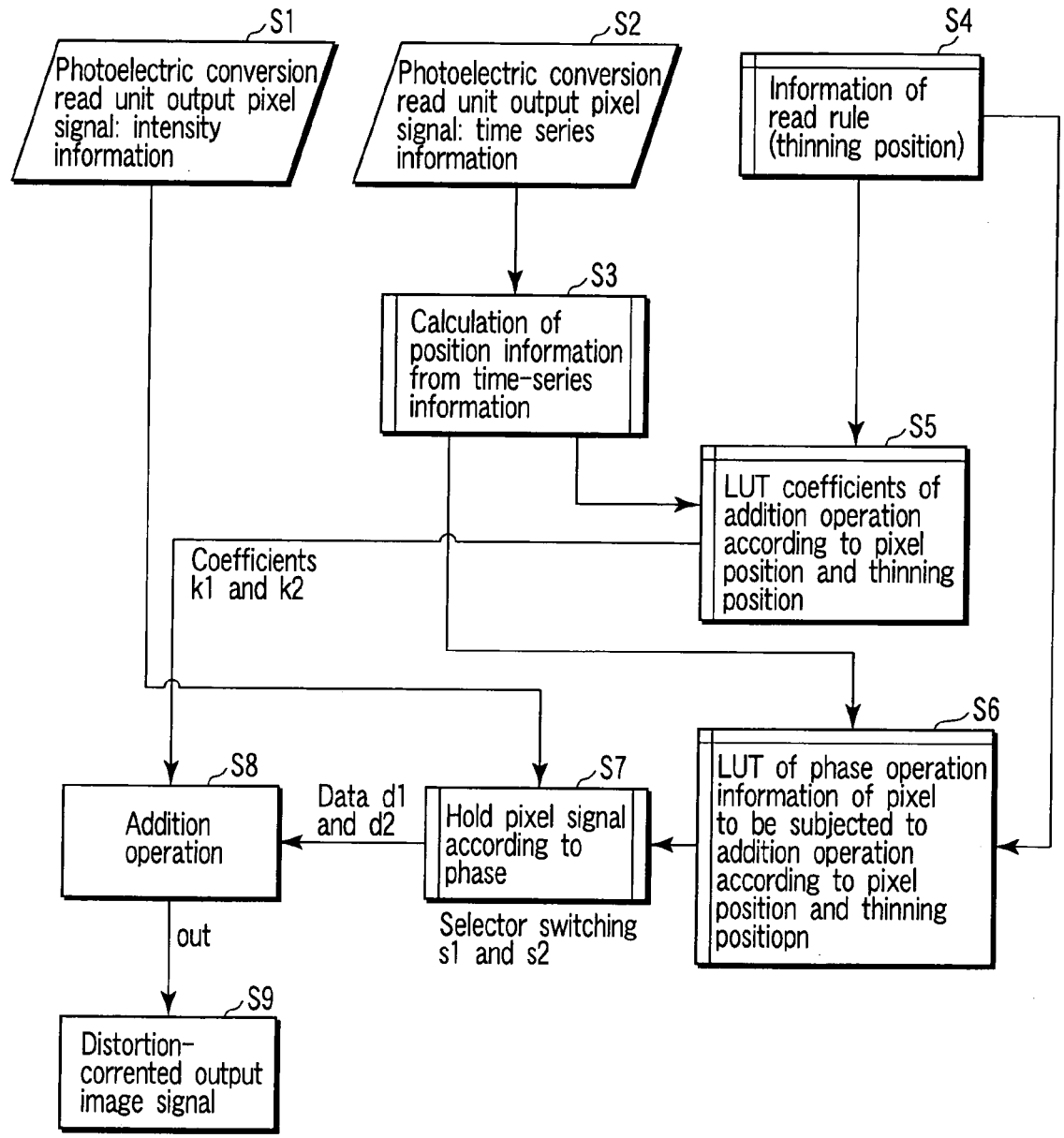
FIG. 8 is a flowchart showing the flow of distortion correction processing.

FIG. 8 shows the flow of distortion correction processing. An image signal has photoelectric conversion intensity information S1 and, in raster scan, time-series information S2. A pixel position can be calculated from the time-series information (S4). As described above, the read rule corresponding to scale conversion is periodical. For example, when size change (electronic zoom) of about 93% is to be executed at maximum, 28/30=0.933. Hence, the period of thinning read for size change is about 30 pixels at most. The position of the target pixel in the period can be calculated from the thinning position in the read rule and the information of the pixel position. For example, in processing at a period of 12 pixels, the 261st pixel from the horizontal start position has a phase of mod(261, 12)=ninth pixel. In this case, mod(N, x) means the remainder obtain by dividing a numerical value N by a numerical value x. As described above, on the basis of the information of the pixel position calculated in S4 and the information of the read rule period and thinning position in S4, the coefficient (S5) of weighted addition operation represented by equation (7) and information (S6) of phase operation of the pixel to be subjected to the adding operation can be obtained. In S7, the image signal to be used is switched in accordance with the phase. In this way, the adding operation is performed by using the pixel designated by the phase information and the weighting coefficient of addition (S8) to obtain a distortion-corrected output pixel.

When the image signal of the photoelectric conversion read unit is directly stored in the memory, and the operation is performed by address designation, the above-described problem of phase can be avoided. Pipeline processing at a higher speed will be described.

Figure 9:
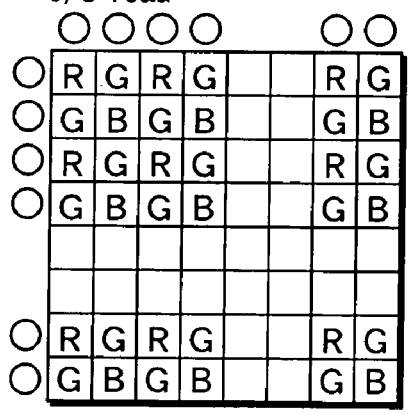
FIG. 9 is a view showing an example in which two of eight pixels are thinned out in both the horizontal and vertical directions.

FIG. 9 shows an example in which two of eight pixels are thinned out in both the horizontal and vertical directions. For example, the read of the first row with thinning in the horizontal direction will be examined. When the upper left corner in FIG. 9 is defined as initial position, the read pixel positions are $Ri_0$, $Gi_1$, $Ri_2$, $Gi_3$, $Ri_6$, and $Gi_7$. This rule is repeated. The matrix expression of distortion correction (conversion) in this example is given by $$\begin{pmatrix} Rc_0 \\ Gc_1 \\ Rc_2 \\ Gc_3 \\ Rc_4 \\ Gc_5 \end{pmatrix} = \begin{pmatrix} 1 & 0 & 0 & 0 & 0 & 0 \\ 0 & \frac{5}{6} & 0 & \frac{1}{6} & 0 & 0 \\ 0 & 0 & \frac{5}{6} & 0 & \frac{1}{6} & 0 \\ 0 & 0 & 0 & \frac{3}{4} & 0 & \frac{1}{4} \\ 0 & 0 & 0 & \frac{1}{6} & 0 & \frac{5}{6} & 0 \\ 0 & 0 & 0 & \frac{1}{12} & 0 & \frac{11}{12} \end{pmatrix} \begin{pmatrix} Ri_0 \\ Gi_1 \\ Ri_2 \\ Gi_3 \\ Ri_6 \\ Gi_7 \end{pmatrix}. \quad (38)$$

The pipeline processing is executed by the filter processing unit shown in FIG. 6. The shift register 162 shifts held image data by one to the right for each operation corresponding to the clock. The selector 164 selects one of the first and third pixel data of five adjacent pixel data held by the shift register 162 in accordance with the state of s1. The selector 166 selects one of the third and fifth pixel data of five adjacent pixel data held by the shift register 162 in accordance with the state of s2.

The multiplier 174 multiplies an output d1 from the selector 164 by the coefficient k1 of weighted addition. The multiplier 176 multiplies an output d2 from the selector 166 by the coefficient k2 of weighted addition. The adder 178 adds the output from the multiplier 174 and the output from the multiplier 176.

Table 1 shows the operation (state transition) of pipeline processing by the filter processing unit shown in FIG. 6.

TABLE 1

| c1 | c2 | c3 | c4 | c5 | c6 | s1 | s2 | d1 | d2 | k1 | k2 | out |
|---|---|---|---|---|---|---|---|---|---|---|---|---|
| i | i1 | i2 | i3 | i4 | i5 | 0 | 0 | i2 | i4 | 1 | 0 | 1 × i2 + 0 × i4 |
| i1 | i2 | i3 | i4 | i5 | i6 | 0 | 0 | i3 | i5 | 5/6 | 1/6 | 5/6 × i3 + 1/6 × i5 |
| i2 | i3 | i4 | i5 | i6 | i7 | 0 | 0 | i4 | i6 | 5/6 | 1/6 | 5/6 × i4 + 1/6 × i6 |
| i3 | i4 | i5 | i6 | i7 | i8 | 0 | 0 | i5 | i7 | 3/4 | 1/4 | 3/4 × i5 + 1/4 × i7 |
| i4 | i5 | i6 | i7 | i8 | i9 | 1 | 1 | i4 | i6 | 1/6 | 5/6 | 1/6 × i4 + 5/6 × i6 |
| i5 | i6 | i7 | i8 | i9 | i10 | 1 | 1 | i5 | i7 | 1/12 | 11/12 | 1/12 × i5 + 11/12 × i7 |
| i6 | i7 | i8 | i9 | i10 | i11 | 0 | 0 | i8 | i10 | 1 | 0 | 1 × i8 + 0 × i10 |
| i7 | i8 | i9 | i10 | i11 | i12 | 0 | 0 | i9 | i11 | 5/6 | 1/6 | 5/6 × i9 + 1/6 × i11 |
| i8 | i9 | i10 | i11 | i12 | i13 | 0 | 0 | i10 | i12 | 5/6 | 1/6 | 5/6 × i10 + 1/6 × i12 |
| i9 | i10 | i11 | i12 | i13 | i14 | 0 | 0 | i11 | i13 | 3/4 | 1/4 | 3/4 × i11 + 1/4 × i13 |
| i10 | i11 | i12 | i13 | i14 | i15 | 1 | 1 | i10 | i12 | 1/6 | 5/6 | 1/6 × i10 + 5/6 × i12 |
| i11 | i12 | i13 | i14 | i15 | i16 | 1 | 1 | i11 | i13 | 1/12 | 11/12 | 1/12 × i11 + 11/12 × i13 |
| i12 | i13 | i14 | i15 | i16 | i17 | 0 | 0 | i14 | i16 | 1 | 0 | 1 × i14 + 0 × i16 |
| i13 | i14 | i15 | i16 | i17 | i18 | 0 | 0 | i15 | i17 | 5/6 | 1/6 | 5/6 × i15 + 1/6 × i17 |
| i14 | i15 | i16 | i17 | i18 | i19 | 0 | 0 | i16 | i18 | 5/6 | 1/6 | 5/6 × i16 + 1/6 × i18 |
| i15 | i16 | i17 | i18 | i19 | i20 | 0 | 0 | i17 | i19 | 3/4 | 1/4 | 3/4 × i17 + 1/4 × i19 |
| i16 | i17 | i18 | i19 | i20 | i21 | 1 | 1 | i16 | i18 | 1/6 | 5/6 | 1/6 × i16 + 5/6 × i18 |
| i17 | i18 | i19 | i20 | i21 | i22 | 1 | 1 | i17 | i19 | 1/12 | 11/12 | 1/12 × i17 + 11/12 × i19 |
| i18 | i19 | i20 | i21 | i22 | i23 | 0 | 0 | i20 | i22 | 1 | 0 | 1 × i20 + 0 × i22 |
| i19 | i20 | i21 | i22 | i23 | i24 | 0 | 0 | i21 | i23 | 5/6 | 1/6 | 5/6 × i21 + 1/6 × i23 |
| i20 | i21 | i22 | i23 | i24 | i25 | 0 | 0 | i22 | i24 | 5/6 | 1/6 | 5/6 × i22 + 1/6 × i24 |

The pixel data sequence (i0, i1, i2, ...) supplied to the shift register 162 shifts to the right for each operation according to the clock from the initial state in which C1=i0, C2=i1, and C3=i2. Accordingly, the selector 164 selects C1 when s1 is 1 (d1=C1) and C3 when s1 is 0 (d1=C3). On the other hand, the selector 166 selects C3 when s2 is 1 (d2=C3) and C5 when s2 is 0 (d2=C5). In synchronism with the clock, the coefficient k1 is supplied from the memory in the filter coefficient setting unit 144 to the multiplier 174, and the coefficient k2 is supplied to the multiplier 176. The adder 178 outputs out=k1× d1+k2×d2.

As is apparent from Table 1, when sequential data shift, selector switching according to the states of s1 and s2, outputs of the weighting coefficients k1 and k2 corresponding to the thinning rule indicated by equation (7), and weighted addition operation are performed synchronously, pipeline processing including pixel phase operation (selector switching) is executed.

When there is only one kind of color information on a single image sensing element, as in a monochrome or 3-chip color image sensing element unlike an image sensing element having CFA (Color Filter Arrays) such as a Bayer matrix or a complementary color filter matrix, the interval of one pixel need not be prepared to process pixels of the same color in distortion correction, unlike the CFA of a Bayer matrix. In addition, thinning need not be executed for two consecutive pixels to make signals of the same color have the same phase (to execute the read in a predetermined order of, e.g., R, G, R, G, ...).

In a single-color image sensing element, the weighed addition of adjacent pixels is done while selecting data. Hence, distortion correction (conversion) is expressed by $$Pc_2 = aPi_1 + (1-a)Pi_2 \qquad (39)$$

where Pc is pixel data after conversion, and Pi is pixel data as the conversion source.

The pipeline processing is executed by the filter processing unit shown in FIG. 7. The shift register 182 shifts held image data by one to the right for each operation corresponding to the clock. The selector 168 selects one of the first and second pixel data of three adjacent pixel data in accordance with the state of s1. The selector 186 selects one of the second and third pixel data of three adjacent pixel data in accordance with the state of s2.

The multiplier 194 multiplies the output d1 from the selector 184 by the coefficient k1 of weighted addition. The multiplier 196 multiplies the output d2 from the selector 186 by the coefficient k2 of weighted addition. The adder 178 adds the output from the multiplier 194 and the output from the multiplier 196. The operation sequence is the same as in FIG. 6.

In the image pickup apparatus of this embodiment, image data acquired by the photoelectric conversion element is thinned out in the hardware in at least vertical direction and, preferably, in both the horizontal and vertical directions, and read. Hence, the image pickup apparatus of this embodiment can read image data in a shorter time than a normal image pickup apparatus which reads out all image data from the photoelectric conversion elements and then thins out the image data by using software.

Additionally, the image pickup apparatus of this embodiment executes distortion correction in which for the pixel-thinned and read image data, thinned pixel data is linearly interpolated, and the pixel data is reduced in accordance with a set region. Hence, the image pickup apparatus of this embodiment can form a high-quality image.

Second Embodiment

This embodiment is particularly directed to an image pickup apparatus which can suitably be used to sense a video.

Figure 10:
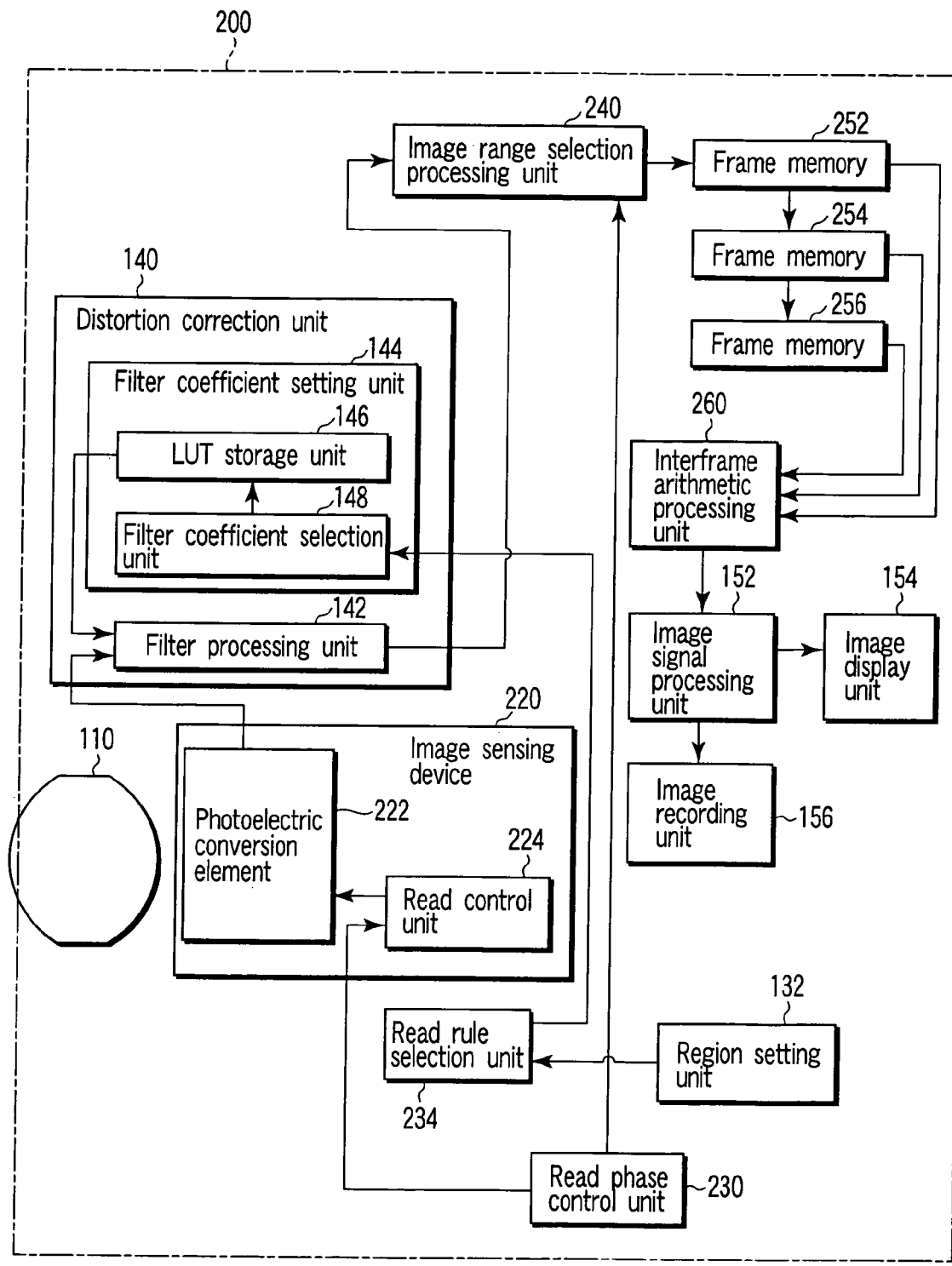
FIG. 10 is a block diagram showing the arrangement of an image pickup apparatus according to the second embodiment of the present invention.

FIG. 10 shows the arrangement of an image pickup apparatus according to the second embodiment of the present invention. The same reference numerals as in the image pickup apparatus 100 of the first embodiment denote the same elements in FIG. 10, and a detailed description thereof will be omitted to avoid any repetitive description.

An image pickup apparatus 200 of this embodiment has an imaging optical system 110 and an image sensing device 220. The imaging optical system 110 forms an optical image of an object. The image sensing device 220 sequentially outputs an image signal in a predetermined region of the optical image formed by the imaging optical system 110. That is, the image signal output from the image sensing device 220 is a video signal. A video signal contains image data of a plurality of sequential frames.

The image sensing device 220 has a two-dimensional photoelectric conversion element 222 and a read control unit 224. The photoelectric conversion element 222 photoelectrically converts the optical image formed by the imaging optical system 110 and acquires digital image data (pixel data set). The read control unit 224 executes, as needed, pixel thinning of the image data acquired by the photoelectric conversion element 222 and sequentially reads the image data.

The image pickup apparatus 200 also has a region setting unit 132, a read rule selection unit 234, and a distortion correction unit 140. The region setting unit 132 sets the region of the image to be output. The read rule selection unit 234 selects the pixel thinning read rule of the read control unit 224. The distortion correction unit 140 corrects distortion of the image data read from the image sensing device 220. Details of the distortion correction unit 140 are the same as those described in the first embodiment.

The image pickup apparatus 200 also has a read phase control unit 230 and an image region selection processing unit 240. The read phase control unit 230 changes, for each frame, the reference position of the range (read range) of image data to be read from the photoelectric conversion element 222 by the read control unit 224. The image region selection processing unit 240 selects a range common to all frames of the image data corrected by the distortion correction unit 140 on the basis of the reference position of the read range set for each frame by the read phase control unit 230.

The read phase control unit 230 changes the reference position of the read range for each frame, and the image region selection processing unit 240 selects the range common to all frames. Accordingly, the read rule selection unit 234 selects the pixel thinning read rule so that the read control unit 224 reads image data in a wider range than the image region set by the region setting unit 132.

The read control unit 224 in the image sensing device 220 sequentially reads image data (pixel data of one frame) in a corresponding range in the pixel sequence in the photoelectric conversion element 222 on the basis of the read rule selected by the read rule selection unit 234 and the reference position of the read range set by the read phase control unit 230. As a result, the image sensing device 220 outputs a video signal containing image data of a plurality of sequential frames.

The image pickup apparatus 200 preferably also has three cyclic frame memories 252, 254, and 256 and an interframe arithmetic processing unit 260. The cyclic frame memories 252, 254, and 256 temporarily store the image data of the plurality of frames. The interframe arithmetic processing unit 260 generates new image data by arithmetically processing the image data of the plurality of frames stored in the frame memories 252, 254, and 256.

In video sensing by a conventional video system, an interlaced scanning method is often used, in which 2 fields=1 frame. Image flicker by the interlaced operation is unnoticeable at a general frame rate of 1/30. If anything, with the interfaced operation, image information in a wide range can be obtained within the same time as in the full scanning operation, and a high-resolution image can be obtained at a high speed by interpolation between fields.

Even when distortion correction expressed by equation (7) described above is executed, pixel data which are not read cannot be reconstructed.

In the image pickup apparatus 200 of this embodiment, omitted pixel data are interpolated between two consecutive frames so that the interlaced operation interpolates omitted pixel data between two fields.

For this purpose, the read phase control unit 230 changes, for each frame, the reference position of the range (read range) of pixel data to be thinned and read from the photoelectric conversion element 222 by the read control unit 224. More specifically, the read phase control unit 230 periodically changes, for each frame, the reference position of the read range in accordance with a predetermined rule.

For example, the read phase control unit 230 shifts the reference position of the range of pixel data to be read by the read control unit 224 so that the image data of a plurality of consecutive frames have no omitted pixel data as a whole. More preferably, the read phase control unit 230 shifts the reference position of the read range so that the image data of two consecutive frames have no common omitted pixel data. The shift amount is preferably about 4 to 8 pixels.

As a consequence, pixel data at a specific position in the photoelectric conversion element 222 that is omitted for thinning read in the image data of a specific frame is contained in the image data of another frame. That is, it can be avoided that pixel data at a specific position in the photoelectric conversion element 222 is always omitted from the image signal output from the image sensing device 220.

The interframe arithmetic processing unit 260 executes processing for interpolating omitted pixel data for the image data of consecutive frames stored in the frame memories 252, 254, and 256. For example, addition of ½:½ is executed for image data of two consecutive frames. Alternatively, addition of ¼:½:¼ may be executed for image data of three consecutive frames.

Figure 11:
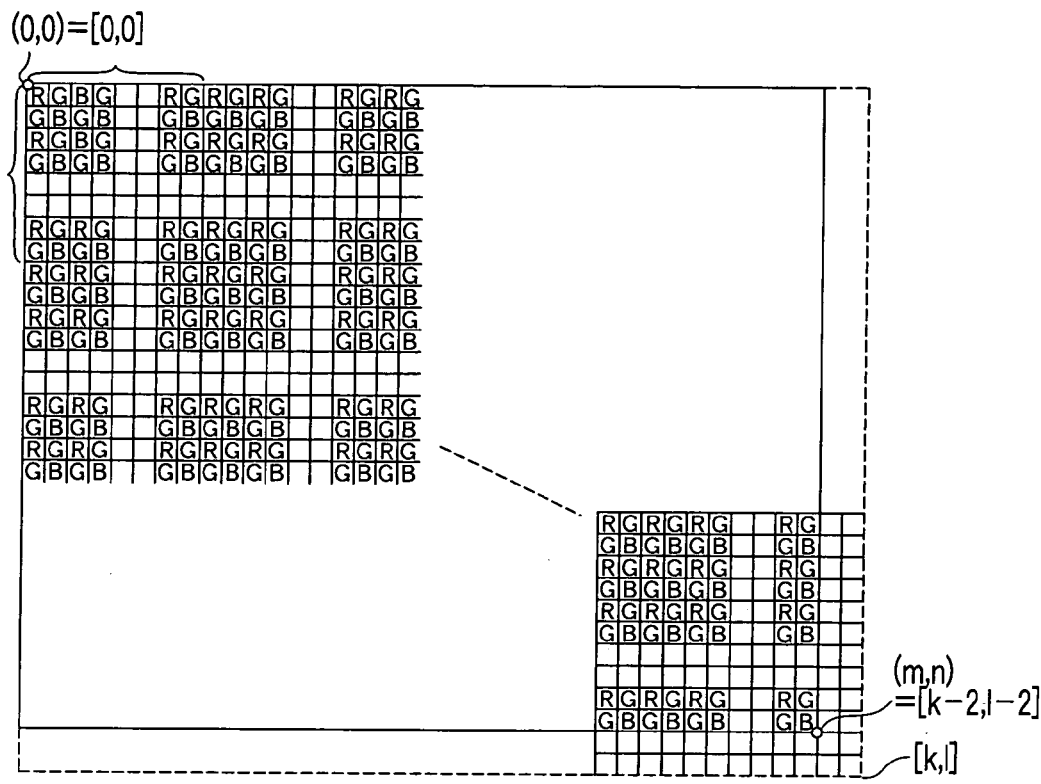
FIG. 11 is a view showing a frame read range in a read by repeating 6/8 thinning read, in which the read start position of the read range matches the upper left pixel of the pixel matrix of a photoelectric conversion element.
Figure 12:
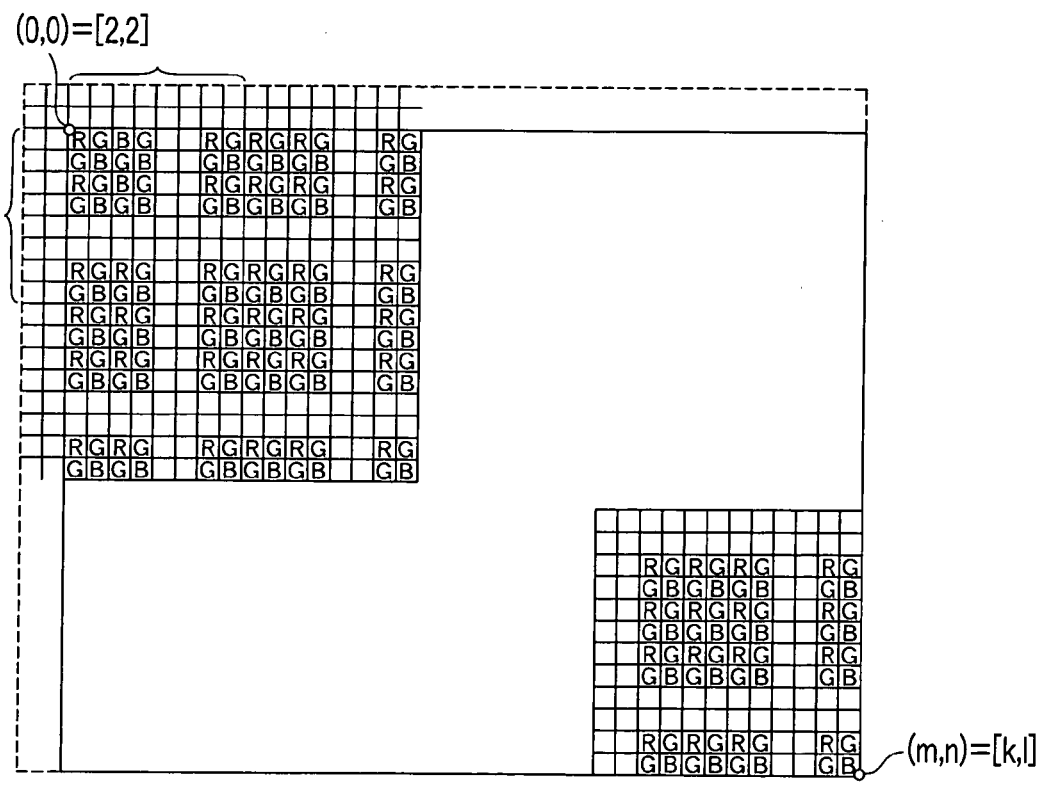
FIG. 12 is a view showing a frame read range in a read by repeating 6/8 thinning read, in which the read end position of the read range matches the lower right pixel of the pixel matrix of the photoelectric conversion element.

FIGS. 11 and 12 schematically show the shift of the reference position of the read range in a read by repeating 6/8 thinning read. Referring to FIGS. 11 and 12, [x, y] represents the pixel position of the pixel sequence in the photoelectric conversion element 122, and (x, y) represents the index of the pixel data array in the read range.

As shown in FIGS. 11 and 12, the number of pixels of the photoelectric conversion element 122 is $\underline{k}$ in the horizontal direction and l in the vertical direction. Hence, the position of the pixel at the upper left of the photoelectric conversion element 122 can be expressed as [0, 0], and the position of the pixel at the lower right can be expressed as [k, l]. The number of pixels in the read range of one frame is $\underline{m}$ in the horizontal direction and n in the vertical direction. Hence, the read start position at the upper left of the frame can be expressed as (0, 0), and the read end position at the lower right can be expressed as (m, n). The frame read range shown in FIG. 12 is shifted by +2 pixels in the horizontal direction and +2 pixels in the vertical direction from the frame read range shown in FIG. 11.

In the frame shown in FIG. 11, the read start position (0, 0) at the upper left matches the upper left pixel position [0, 0] of the photoelectric conversion element 222. That is, $$(0,0)=[0,0] \tag{40}$$

The read end position (m, n) is given by $$(m,n)=[k-2, l-2] \tag{41}$$

On the other hand, in the frame shown in FIG. 12, the read start position at the upper left is given by $$(0,0)=[2,2] \tag{42}$$

The read end position is given by $$(m,n)=[k,l] \tag{43}$$

The image region selection processing unit 240 selects a range common to the frame shown in FIG. 11 and that shown in FIG. 12. That is, for the frame shown in FIG. 11, the image region selection processing unit 240 selects a rectangular range having (2, 2) and (m, n) as the diagonal apices. For the frame shown in FIG. 12, the image region selection processing unit 240 selects a rectangular range having (0, 0) to (m−2, n−2) as the diagonal apices. The range selected by the image region selection processing unit 240 always has (m−2)×(n−2) pixel data.

When the region to be cropped is taken into consideration in advance, the total number of images to be read from the photoelectric conversion element 222 must take the output image size and phase shift amount into consideration. The image region selection processing unit 240 changes the crop range on the basis of the information of the read start position.

The frame memories 252, 254, and 256 are FIFO (First In First Out) memories. The interframe arithmetic processing unit 260 generates an output image by using pixels at the same position in the frame memories 252, 254, and 256.

For, e.g., two frames, a synthetic image out(i, j) is given by $$\text{out}(i,j)=0.5I(k,i,j)+0.5I(k-1,i,j) \tag{44}$$

where i,j is the pixel position, and I(k, i, j) is the intensity of the image signal at the pixel position i,j of the kth frame.

For three frames, the synthetic image out(i, j) is given by $$\text{out}(i,j)=0.25I(k,i,j)+0.5I(k-1,i,j)+0.25I(k-2,i,j) \tag{45}$$

by using weighted distribution. When interframe interpolation is executed, an effect of increasing the image quality by low-pass operation can be obtained in addition to the distortion correction effect.

In this embodiment, thinning read is executed in both the horizontal and vertical directions, and linear distortion correction is executed by pipeline processing in both the horizontal and vertical directions. For a CCD, an image sensing element which executes an operation of vertical transfer→horizontal transfer cannot thin image data in the horizontal direction and read it in principle. For this reason, in the horizontal direction, all pixels must be read, and a size change by linear interpolation must be executed, as in equation (1). In the vertical direction, thinning read and distortion correction are executed, as indicated by equation (7) described above.

To shorten the image sensing time, interlaced read of a plurality of fields may be executed in the vertical direction on the assumption of interpolation, as in the conventional video system, and the above-described thinning read and distortion correction may be executed in the horizontal direction. As the image of each field after distortion correction, an image is generated by synthesis based on interpolation by the same arrangement as that shown in FIG. 10.

Figure 13:
FIG. 13 is a view showing a image which is obtained by executing thinning read of two of 14 pixels (6/7 size change) and then executing averaging processing between consecutive frames.
Figure 14:
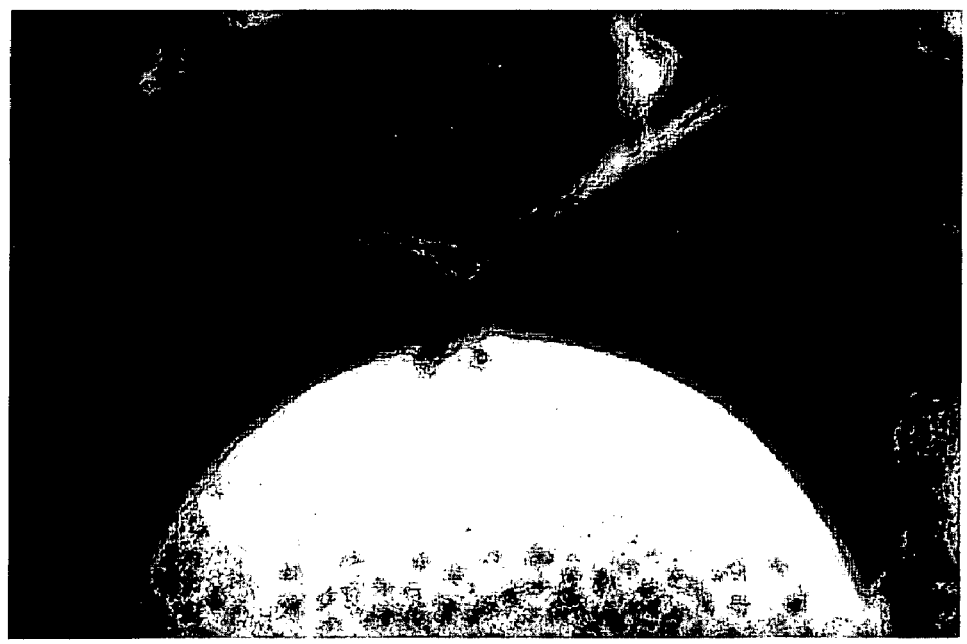
FIG. 14 is a view showing a image which is obtained by executing distortion correction (pixel data interpolation) as well as thinning read of two of 14 pixels (6/7 size change) and then executing averaging processing between consecutive frames.

FIG. 13 shows a snap shot of a video which is obtained by executing thinning read of two of 14 pixels (6/7 size change) and then executing averaging processing between consecutive frames. FIG. 14 shows a snap shot of a video which is obtained by executing distortion correction (pixel data interpolation) as well as thinning read of two of 14 pixels (6/7 size change) and then executing averaging processing between consecutive frames. When the images are compared, the distortion of the edge portion in the image shown in FIG. 14 is smaller than the image shown in FIG. 13.

The image pickup apparatus of this embodiment has the same advantage as that of the image pickup apparatus of the first embodiment.

In addition, the image pickup apparatus of this embodiment reads image data while changing the read rule for each frame in video sensing, thereby avoiding omission of pixel data at a specific position in the photoelectric conversion element. With this arrangement, the image pickup apparatus of this embodiment can form a high-resolution video with reduced distortion.

The image pickup apparatus of this embodiment preferably interpolates omitted pixel data on the basis of image data of consecutive frames to avoid omission of real pixel data in some frames. With this arrangement, the image pickup apparatus of this embodiment can form a high-resolution video with further reduced distortion and moiré.

Third Embodiment

FIG. 17 shows the arrangement of an image pickup apparatus according to the third embodiment of the present invention. The same reference numerals as in the image pickup apparatus 100 of the first embodiment denote the same elements in FIG. 17, and a detailed description thereof will be omitted to avoid any repetitive description.

An image pickup apparatus 300 of this embodiment has an imaging optical system 110 and an image sensing device 220. The imaging optical system 110 forms an optical image of an object. The image sensing device 220 sequentially outputs an image signal in a predetermined region of the optical image formed by the imaging optical system 110. That is, the image signal output from the image sensing device 220 is a video. A video contains image data of a plurality of sequential frames.

The image sensing device 220 has a two-dimensional photoelectric conversion element 222 and a read control unit 224. The photoelectric conversion element 222 photoelectrically converts the optical image formed by the imaging optical system 110 and acquires digital image data (pixel data set). The read control unit 224 executes, as needed, pixel thinning of the image data acquired by the photoelectric conversion element 222 and sequentially reads the image data.

The image pickup apparatus 300 also has a region setting unit 132, a read rule selection unit 302, and a distortion correction unit 140. The region setting unit 132 sets the region of the image to be output. The read rule selection unit 302 selects the pixel thinning read rule of the read control unit 224. The distortion correction unit 140 corrects distortion of the image data read from the image sensing device 220. Details of the distortion correction unit 140 are the same as those described in the first embodiment.

In the image pickup apparatus 300, for the read rule of image data to be read from the photoelectric conversion element 222 by the read control unit 224, a read phase modulation unit 306 modulates the read rule for each frame in synchronism with a timing generator 304. The read phase modulation unit 306 generates different read layouts for the respective frames. However, the total number of pixels is not changed. The distortion correction unit 140 has a filter processing unit 142 and filter coefficient setting unit 144. The filter processing unit 142 executes filter processing according to the read rule generated by the read phase modulation unit 306. The filter coefficient setting unit 144 sets a filter coefficient to be used for the filter processing by the filter processing unit 142.

Image data which is read in accordance with different read rule between a plurality of frames and has undergone filter processing of distortion correction is subjected to interframe arithmetic processing by an interframe arithmetic unit 308 so that data is output to a subsequent processing system (not shown).

The embodiments of the present invention have been described above with reference to the accompanying drawings. However, the present invention is not limited to these embodiments, and various changes and modifications can be made without departing from the spirit and scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus which outputs an image of an object, comprising:

an image sensing device which includes a photoelectric conversion element which photoelectrically converts an optical image to acquire image data, and a read control unit which thins out pixels, as needed, and reads the image data acquired by the photoelectric conversion element;

a region setting unit which sets a region of an output image of the image sensing device;

a read rule selection unit which selects a pixel thinning read rule of the read control unit in accordance with the region set by the region setting unit; and a distortion correction unit which corrects distortion of the image data read from the photoelectric conversion element by the read control unit, the distortion correction unit having a filter processing unit which executes filter processing for the image data read from the photoelectric conversion element on the basis of the pixel thinning read rule selected by the read rule selection unit.

2. An image pickup apparatus according to claim 1, wherein the distortion correction unit also includes a filter coefficient setting unit which sets a filter coefficient to be used for the filter processing, the filter coefficient setting unit including a storage unit which stores a lookup table containing the filter coefficient, and a filter coefficient selection unit which selects, in accordance with the pixel thinning read rule selected by the read rule selection unit, the filter coefficient from the lookup table stored in the storage unit.

3. An image pickup apparatus according to claim 2, wherein the lookup table of the filter coefficient is set in accordance with the read rule.

4. An image pickup apparatus according to claim 2, which further comprises a timing generator and a read phase modulation unit which modulates, for the read rule from the read rule selection unit, a read rule for each frame in synchronism with the timing generator, and in which the distortion correction unit executes the filter processing in accordance with the read rule generated by the read phase modulation unit.

5. An image pickup apparatus according to claim 1, which further comprises a timing generator and a read phase modulation unit which modulates, for the read rule from the read rule selection unit, a read rule for each frame in synchronism with the timing generator, and in which the distortion correction unit executes the filter processing in accordance with the read rule generated by the read phase modulation unit.

6. An image pickup apparatus according to claim 1, wherein the distortion correction unit also includes a filter coefficient setting unit which sets a filter coefficient to be used for the filter processing, the filter coefficient setting unit calculating the filter coefficient by executing an operation according to the pixel thinning read rule set by the read rule selection unit.

7. An image pickup apparatus according to claim 1, in which the image signal output from the photoelectric conversion element is a video signal containing image data of a plurality of sequential frames, and which further comprises a read phase control unit which changes, for each of the plurality of frames, a reference position of a read range of image data to be read from the photoelectric conversion element by the read control unit, an image region selection processing unit which selects a range of a region common to the plurality of frames of the image data corrected by the distortion correction unit in accordance with the reference position of the read range set for each frame by the read phase control unit, and an image signal processing unit which outputs the image signal in the region whose range is selected by the image region selection processing unit.

8. An image pickup apparatus according to claim 1, wherein the image signal output from the photoelectric conversion element is a video signal containing image data of a plurality of sequential frames, the read rule is changed for each of the plurality of frames, and the filter processing unit executes distortion correction according to the read rule.

9. An image pickup apparatus according to claim 8, further comprising an image processing unit which executes predetermined processing for the image signal output from the distortion correction unit.

10. An image pickup apparatus according to claim 9, which further comprises a plurality of storage units which temporarily store the image data of the plurality of frames, and an interframe arithmetic processing unit which executes arithmetic processing for the image data of the plurality of frames stored in the plurality of storage units to generate new image data, and in which the image signal processing unit outputs an image signal of the image formed by the interframe arithmetic processing unit.

11. An image pickup apparatus according to claim 7, which further comprises a plurality of storage units which temporarily store the image data of the plurality of frames, and an interframe arithmetic processing unit which executes arithmetic processing for the image data of the plurality of frames stored in the plurality of storage units to generate new image data, and in which the image signal processing unit outputs an image signal of the image formed by the interframe arithmetic processing unit.

12. An image pickup apparatus according to claim 9, which further comprises an interframe arithmetic processing unit which executes arithmetic processing for the image data of the plurality of frames to generate new image data, and in which the image signal processing unit outputs an image signal of the image formed by the interframe arithmetic processing unit.

13. An image pickup apparatus according to claim 7, which further comprises an interframe arithmetic processing unit which executes arithmetic processing for the image data of the plurality of frames to generate new image data, and in which the image signal processing unit outputs an image signal of the image formed by the interframe arithmetic processing unit.

14. An image pickup apparatus according to claim 12, wherein the arithmetic processing for the image data of the plurality of frames is weighted mean.

15. An image pickup apparatus according to claim 11, wherein the arithmetic processing for the image data of the plurality of frames is weighted mean.

16. An image pickup apparatus according to claim 1, wherein the photoelectric conversion element is a single-chip color image sensing element having a color filter array arranged on a front surface, and the filter processing unit has a shift register which temporarily holds an image signal read from the single-chip color image sensing element, two selectors which select read positions at which, of the image signal, signal components of the same color are to be read out from the shift register, two multipliers which multiply the image signals read out from the shift register by the two selectors by correction coefficients, respectively, and an adder which adds arithmetic results from the two multipliers, and corrects distortion of image information read from the single-chip color image sensing element by pipeline processing in which the number of input data equals the number of output data.

17. An image pickup apparatus according to claim 1, wherein the photoelectric conversion element is one of a monochrome image sensing element and a multiple-chip color image sensing element, and the filter processing unit has a shift register which temporarily holds an image signal read from one of the monochrome image sensing element and the multiple-chip color image sensing element, two selectors which select read positions at which the image signal is to be read out from the shift register, two multipliers which multiply the image signals read out from the shift register by the two selectors by correction coefficients, respectively, and an adder which adds arithmetic results from the two multipliers, and corrects distortion of image information read from one of the monochrome image sensing element and the multiple-chip color image sensing element by pipeline processing in which the number of input data equals the number of output data.

18. An image pickup apparatus according to claim 17, wherein the selector selects the read position at which the image signal is to be read out from the shift register, on the basis of the pixel thinning read rule selected by the read rule selection unit.

19. An image pickup apparatus according to claim 16, wherein the selector selects the read position at which the image signal is to be read out from the shift register, on the basis of the pixel thinning read rule selected by the read rule selection unit.

20. A signal processing method of an image pickup apparatus including an image sensing device which includes a photoelectric conversion element which photoelectrically converts an optical image to acquire image data, and a read control unit which thins out pixels, as needed, and reads the image data acquired by the photoelectric conversion element, comprising:

setting a region of an output image of the image sensing device;

selecting a pixel thinning read rule in accordance with the set region;

causing the read control unit to thin out pixels and read the image data from the photoelectric conversion element in accordance with the selected pixel thinning read rule;

setting a filter coefficient in accordance with the selected pixel thinning read rule and executing filter processing for the image data read from the photoelectric conversion element to correct distortion of the image data; and executing predetermined processing for the distortion-corrected image signal.

21. A signal processing method of an image pickup apparatus including an image sensing device which includes a photoelectric conversion element which photoelectrically converts an optical image to acquire image data, comprising:

setting a region of an output image of the image sensing device;

selecting a pixel thinning read rule in accordance with the set region;

reading the image data from the photoelectric conversion element on the basis of the selected pixel thinning read rule; and executing filter processing for the read image data to correct distortion of the image data.

22. A signal processing method according to claim 21, wherein in the correcting the distortion correction of the image data, a filter coefficient is set in accordance with the selected pixel thinning read rule, and the filter processing for the image data read from the photoelectric conversion element is executed.

23. A signal processing method according to claim 22, wherein the filter coefficient is selected from a lookup table containing a plurality of filter coefficients in accordance with the selected pixel thinning read rule.

24. A signal processing method according to claim 20, wherein the filter coefficient is selected from a lookup table containing a plurality of filter coefficients in accordance with the selected pixel thinning read rule.

25. A signal processing method according to claim 22, wherein the filter coefficient is calculated by executing an operation according to the selected pixel thinning read rule.

26. A signal processing method according to claim 20, wherein the filter coefficient is calculated by executing an operation according to the selected pixel thinning read rule.

27. A signal processing method according to claim 21, wherein a video signal containing image data of a plurality of sequential frames is output from the image sensing device, a read range of the image data to be read from the image sensing device is set for each frame, and the distortion correction is executed in accordance with a reference position of the read range set for each frame, a range of a region common to the plurality of frames of the distortion-corrected image data is selected, and the image signal in the region whose range is selected is output.

28. A signal processing method according to claim 20, wherein a video signal containing image data of a plurality of sequential frames is output from the image sensing device, a read range of the image data to be read from the image sensing device is set for each frame, and the distortion correction is executed in accordance with a reference position of the read range set for each frame, a range of a region common to the plurality of frames of the distortion-corrected image data is selected, and the image signal in the region whose range is selected is output.

* * * * *